US012793439B2

(12) United States Patent
Ihara

(10) Patent No.: US 12,793,439 B2
(45) Date of Patent: Nov. 10, 2026

(54) CONTENT DISTRIBUTION SYSTEM AND OPERATION METHOD OF CONTENT DISTRIBUTION SYSTEM, MOVING BODY AND OPERATION METHOD OF MOVING BODY, TERMINAL DEVICE AND OPERATION METHOD OF TERMINAL DEVICE, AND PROGRAM

(71) Applicant: Sony Group Corporation, Tokyo (JP)

(72) Inventor: Tetsugoro Ihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 132 days.

(21) Appl. No.: 18/721,873

(22) PCT Filed: Dec. 14, 2022

(86) PCT No.: PCT/JP2022/046029
§ 371 (c)(1),
(2) Date: Jun. 20, 2024

(87) PCT Pub. No.: WO2023/127496
PCT Pub. Date: Jul. 6, 2023

(65) Prior Publication Data

US 2025/0078529 A1 Mar. 6, 2025

(30) Foreign Application Priority Data

Dec. 27, 2021 (JP) .................................. 2021-21255

(51) Int. Cl.
*G06V 20/58* (2022.01)
*G06V 20/59* (2022.01)
*H04N 21/431* (2011.01)

(52) U.S. Cl.
CPC .......... *G06V 20/584* (2022.01); *G06V 20/597* (2022.01); *H04N 21/4318* (2013.01)

(58) Field of Classification Search
CPC ............... G06V 20/584; G06V 20/597; H04N 21/4318; H04N 21/2187; H04N 21/4223;
(Continued)

(56) References Cited

U.S. PATENT DOCUMENTS 11,227,409 B1 * 1/2022 Wu ...................... H04N 17/002
11,321,923 B2 * 5/2022 Rober .................... B60K 35/26
(Continued)

FOREIGN PATENT DOCUMENTS

EP 3705162 A1 9/2020
JP 2020-154963 A 9/2020
JP 2021-524626 A 9/2021

OTHER PUBLICATIONS

International Search Report and Written Opinion mailed on Mar. 7, 2023, received for PCT Application PCT/JP2022/046029, filed on Dec. 14, 2022, 8 pages including English Translation.

*Primary Examiner* — Nathan J Flynn
*Assistant Examiner* — Christine A Kurien
(74) *Attorney, Agent, or Firm* — XSENSUS LLP

(57) ABSTRACT

A content distribution system enables a user to provide content to be reproduced under a predetermined reproduction condition to a passenger in a drive environment in which the passenger who gets on a vehicle and moves and the user who is not on the vehicle virtually ride together. When a virtual drive environment is provided by sharing an image and audio captured in a vehicle between the vehicle and a user terminal operated by the user who is not on the vehicle, the user terminal is operated to edit and generate content together with reproduction conditions, and transmit the edited content to the vehicle. In the vehicle, the content is reproduced when the reproduction condition is satisfied. The present disclosure can be applied to a content distribution system.

20 Claims, 22 Drawing Sheets

(58) Field of Classification Search
CPC ............. H04N 21/4312; H04N 21/812; H04N 21/8146; H04N 21/41422; H04N 21/478; H04N 21/6582; A63F 13/65; G06F 3/011; G06F 3/01; G08G 1/09; G08G 1/16
See application file for complete search history.

(56) References Cited

U.S. PATENT DOCUMENTS

| | | | | |
|---|---|---|---|---|
| 12,056,898 | B1 * | 8/2024 | Wu | G01S 17/931 |
| 2005/0256616 | A1 * | 11/2005 | Rhoads | H04L 69/329<br>701/1 |
| 2008/0133705 | A1 * | 6/2008 | Lemond | G06Q 30/04<br>709/217 |
| 2013/0083062 | A1 * | 4/2013 | Geisner | G02B 27/017<br>345/633 |
| 2017/0267099 | A1 * | 9/2017 | Yerli | B60K 35/28 |
| 2019/0246175 | A1 * | 8/2019 | McCarty | G06V 20/41 |
| 2019/0355178 | A1 * | 11/2019 | Hermina Martinez | G06V 20/593 |
| 2020/0258311 | A1 * | 8/2020 | Rober | B60W 10/22 |
| 2020/0349666 | A1 * | 11/2020 | Hodge | G01C 21/3602 |
| 2024/0394007 | A1 * | 11/2024 | Shimohira | G06F 3/017 |

* cited by examiner

FIG. 7

| VEHICLE ID | STARTING POINT (LATITUDE) | STARTING POINT (LONGITUDE) | CURRENT LATITUDE | CURRENT LONGITUDE | LENGTH (TIME) |
|---|---|---|---|---|---|
| 35oi4hf9k | 35.710089 | 139.810711 | 35.710089 | 139.810719 | 01:58:37:96 |
| lbo7fd83p | 35.****** | 139.****** | 35.****** | 139.****** | 00:04:52:48 |
| s89c6wp1 | 35.****** | 139.****** | 35.****** | 139.****** | 00:36:45:22 |

FIG. 8

| CONTENT ID | CONTENT NAME | ATTRIBUTE | MATERIAL ID | REPRODUCTION CONDITION | VEHICLE IDENTIFICATION |
|---|---|---|---|---|---|
| G35oi4hf9k | LEVEL-UP | SOUND EFFECT | kd92kr50 | P1 (ENTERING) | All |
| Glb34o7fdp | MIRROR BALL | LIGHT PERFORMANCE | 3lic9r7ds | C3 (IMAGING) | 35oi4hf9k |
| Gs89c6wp1 | AR ADVERTISEMENT | ANIMATION | uygv23w | S7 (DETECTION) | Model_L |

CONTENT DISTRIBUTION SYSTEM AND OPERATION METHOD OF CONTENT DISTRIBUTION SYSTEM, MOVING BODY AND OPERATION METHOD OF MOVING BODY, TERMINAL DEVICE AND OPERATION METHOD OF TERMINAL DEVICE, AND PROGRAM

CROSS-REFERENCE TO RELATED APPLICATIONS

The present application is based on PCT filing PCT/JP2022/046029, filed Dec. 14, 2022, which claims priority from Japanese Patent Application No. 2021-212255, filed Dec. 27, 2021, the entire contents of each are incorporated herein by reference.

TECHNICAL FIELD

The present disclosure relates to a content distribution system and an operation method of the content distribution system, a moving body and an operation method of the moving body, a terminal device and an operation method of the terminal device, and a program, and more particularly, to a content distribution system and an operation method of the content distribution system, a moving body and an operation method of the moving body, a terminal device and an operation method of the terminal device, and a program that enable a user to provide content to be reproduced under a predetermined reproduction condition to a passenger in a drive environment in which the passenger who gets on a vehicle and moves and the user who is not on the vehicle virtually ride together.

BACKGROUND ART

There has been proposed a technique in which a user expresses the user with an avatar in a virtual space inside a vehicle traveling in a remote place distant from a real space so that a driver of the vehicle and the user in the remote place virtually ride on the same vehicle (see Patent Document 1).

CITATION LIST

Patent Document

Patent Document 1: Japanese Patent Application Laid-Open No. 2020-154963

SUMMARY OF THE INVENTION

Problems to be Solved by the Invention

However, in the technology described in Patent Document 1, it is possible to realize interaction between a passenger who gets on the vehicle and moves and a user who does not get on the vehicle, but it is not possible for the user to provide content to be reproduced under a predetermined reproduction condition to the passenger.

The present disclosure has been made in view of such a situation, and in particular, enables a user to provide a passenger with content to be reproduced by the user under a predetermined reproduction condition in a drive environment in which the passenger who gets on a vehicle and moves and the user who does not get on the vehicle virtually ride together.

Solutions to Problems

A content distribution system and a program according to a first aspect of the present disclosure are a content distribution system and a program including: a moving body; and a terminal device that operates by an operation input of a user who is not on the moving body, the moving body including: an imaging unit that captures an image in front of the moving body in a moving direction; a first communication unit that transmits the image to the terminal device; and a reproducing unit that reproduces a predetermined content when a predetermined reproduction condition is satisfied, the terminal device including: a generation unit that edits a content to be reproduced in the moving body and a reproduction condition of the content to generate a content package; a second communication unit that receives the image of the moving body and transmits the content package to the moving body; and an output unit that outputs the image of the moving body received by the second communication unit, in which the moving body receives the content package generated by the generation unit from the terminal device via the first communication unit, and reproduces the content in the reproduction unit on the basis of a reproduction condition included in the content package received.

An operation method of a content distribution system according to a first aspect of the present disclosure is an operation method of a content distribution system including: a moving body; and a terminal device that operates by an operation input of a user who is not on the moving body, an operation method of the moving body including the steps of: capturing an image in front of the moving body in a moving direction; transmitting the image to the terminal device; and reproducing a predetermined content when a predetermined reproduction condition is satisfied, an operation method of the terminal device including the steps of: editing a content to be reproduced in the moving body and a reproduction condition of the content to generate a content package; receiving the image of the moving body and transmitting the content package to the moving body together with the reproduction condition; and outputting the image received of the moving body, further including a step in which the moving body receives the content package generated by the terminal device and reproduces the content on the basis of a reproduction condition included in the content package received.

In the first aspect of the present disclosure, the moving body transmits an image to an imaging unit that captures the image of the moving body in a moving direction and the terminal device and reproduces a predetermined content when a predetermined reproduction condition is satisfied, the terminal device generates a content package by editing the content to be reproduced in the moving body and the reproduction condition of the content, receives the image of the moving body, transmits the content package to the moving body, and outputs the received image of the moving body, and the moving body receives the generated content package from the terminal device, and reproduces the content on the basis of the reproduction condition included in the received content package.

A moving body and a program according to a second aspect of the present disclosure are a moving body and a program including: an imaging unit that captures an image in front of a moving body in a moving direction; a communication unit that transmits the image to a terminal device operated by an operation input of a user who is not on the moving body, and receives a content package generated by editing a content and a reproduction condition by the terminal device; and a reproduction unit that reproduces the content when the reproduction condition is satisfied.

An operation method of a moving body according to a second aspect of the present disclosure is an operation method of a moving body, the operation method including the steps of: capturing an image in front of a moving object in a moving direction; transmitting the image to a terminal device operated by an operation input of a user who is not on the moving body, and receiving a content package generated by editing a content and a reproduction condition by the terminal device; and reproducing the content when the reproduction condition is satisfied.

In the second aspect of the present disclosure, an image in front of a moving body in a moving direction is captured, the image is transmitted to a terminal device that operates by an operation input of a user who is not on board the moving body, a content package generated by editing a content and a reproduction condition is received by the terminal device, and the content is reproduced when the reproduction condition is satisfied.

A terminal device and a program according to a third aspect of the present disclosure are a terminal device and a program including: a generation unit that generates a content package by editing a content to be reproduced in a moving body on which a user of the moving body does not board and a reproduction condition of the content; a communication unit that receives an image of the moving body and transmits the content package to the moving body; and an output unit that outputs the image of the moving body.

An operation method of a terminal device according to a third aspect of the present disclosure is an operation method of a terminal device, the operation method including the steps of: generating a content package by editing a content to be reproduced in a moving body on which a user of the moving body does not board and a reproduction condition of the content; receiving an image of the moving body and transmitting the content package to the moving body; and outputting the image of the moving body.

In the third aspect of the present disclosure, a content package is generated by editing a content to be reproduced in a moving body on which a user of the moving body is not riding and a reproduction condition of the content, an image of the moving body is received, the content package is transmitted to the moving body, and the image of the moving body is output.

BRIEF DESCRIPTION OF DRAWINGS

FIG. 7 is a diagram for explaining a configuration example of a vehicle information DB.

FIG. 8 is a diagram for explaining a configuration example of an interaction information DB.

MODE FOR CARRYING OUT THE INVENTION

Figure 1:
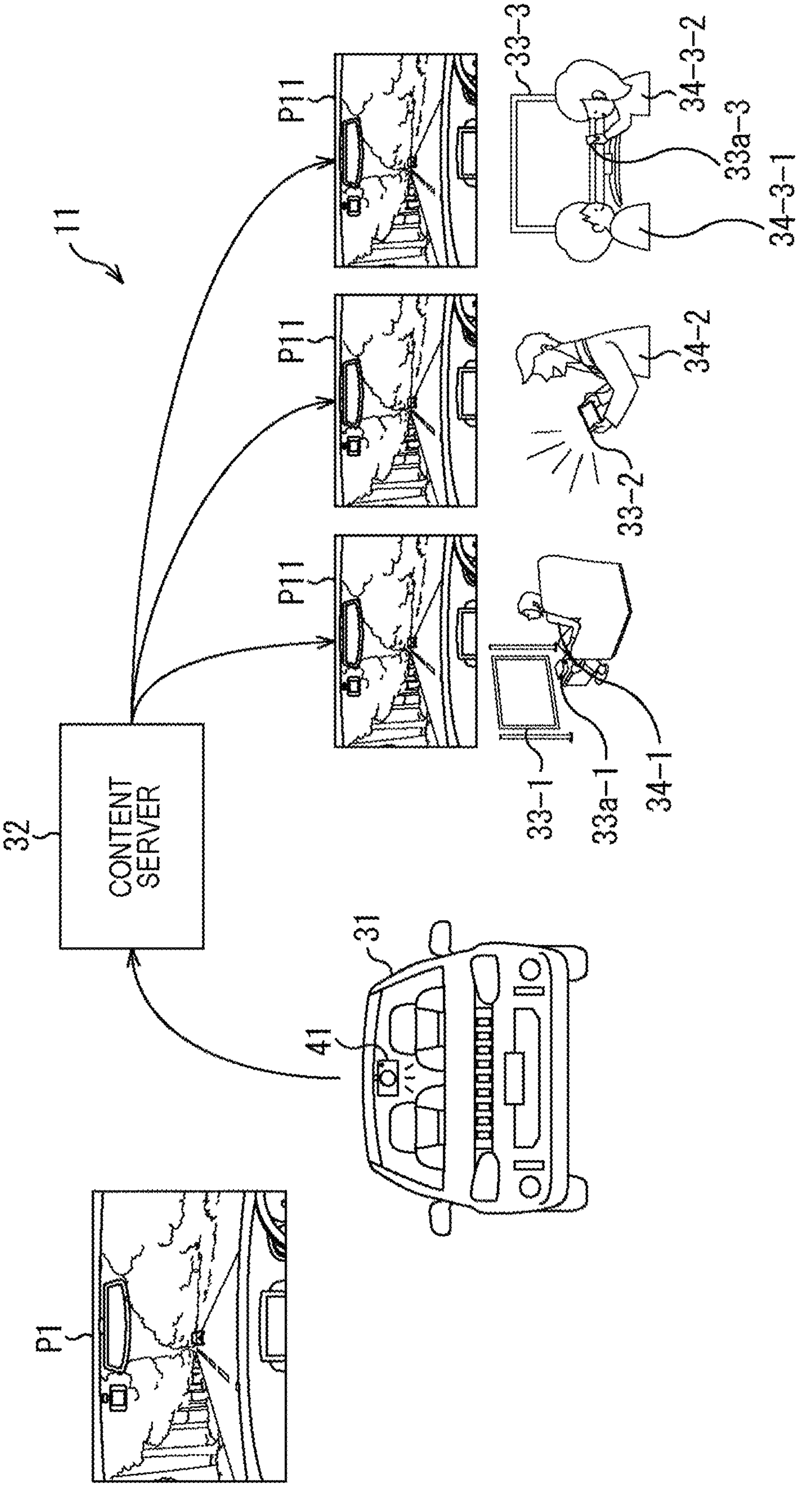
FIG. 1 is a diagram for explaining an outline of a content distribution system of the present disclosure.

A preferred embodiment of the present disclosure is hereinafter described in detail with reference to the accompanying drawings. Note that in the present specification and the drawings, components having substantially the same functional configurations are denoted by the same reference signs, and redundant descriptions are omitted.

Hereinafter, a mode for carrying out the present technology will be described. The description will be made in the following order.

1. Preferred Embodiment
1-1. Outline of Content Distribution System of Present Disclosure
1-2. Content Distribution System of Present Disclosure
1-3. Configuration Example of Vehicle Control System
1-4. Configuration Example of Content Server
1-5. Configuration Example of Vehicle Information DB
1-6. Configuration Example of Interaction DB
1-7. Configuration Example of User Terminal
1-8. Drive Image Sharing Processing
1-9. Image Upload Processing
1-10. Image Storage Processing
1-11. Sharing Request Processing, Vehicle List Generation Processing, Vehicle Selection Processing, and Connection Request Processing
1-12. Connection Establishment Processing
1-13. Shared Image Transfer Processing
1-14. Drive Image Display Processing 1-15. Interaction Processing
1-16. Details of Interaction Processing
2. Example Executed by Software 1. Preferred Embodiment <1-1. Outline of Content Distribution System of Present Disclosure>

In particular, the present disclosure enables provision of content to be reproduced by a user under a predetermined reproduction condition to a passenger in a drive environment in which the passenger who gets on the vehicle and moves and the user who does not get on the vehicle virtually ride together, and improves the sense of unity and realistic feeling between the passenger and the user in the virtual drive environment.

First, an outline of a content distribution system of the present disclosure will be described with reference to FIGS. 1 and 2.

A content distribution system 11 of the present disclosure includes a vehicle 31, a content server 32, and user terminals 33-1 to 33-3, and has a configuration capable of exchanging data and programs with each other via a network represented by the Internet (not illustrated) or the like or a public communication line.

Note that, in this example, an example in which the number of the user terminals 33 is three is illustrated, but the number is only required to be one or more.

The content server 32 may be realized by cloud computing formed on a network in which various configurations of the content distribution system 11 can communicate with each other.

The vehicle 31 includes an imaging device 41 that functions as a drive recorder or the like, and captures an image in front of the vehicle 31 as indicated by an image P1, for example, during movement to a destination, and transmits the image to the content server 32.

When acquiring the image P1 transmitted from the vehicle 31, the content server 32 converts the image P1 into an image P11 that can be displayed on each of the user terminals 33-1 to 33-3 possessed by the user who is not on board in the vehicle 31 and distributes the image P11.

The user terminals 33-1 to 33-3 are, for example, terminal devices used by the user 34-1, the user 34-2, and the users 34-3-1 and 34-3-2 respectively present in different spaces at remote places from the vehicle 31, and display the image P11 corresponding to the image P1 captured by the imaging device 41 functioning as a drive recorder or the like of the vehicle 31 distributed from the content server 32.

In the example of FIG. 1, the user terminal 33-1 is, for example, a personal computer (hereinafter, referred to as a personal computer) or the like, and displays the image P11 supplied from the content server 32 on the display unit.

In addition, when various commands are input by an input means 33*a*-1 such as a keyboard and a mouse operated by the user 34-1, the user terminal 33-1 executes an operation corresponding to the input command.

The user terminal 33-2 includes, for example, a portable terminal such as a smartphone, and displays the image P11 supplied from the content server 32 on the display unit, and when the touch panel also serving as the display unit is operated by the user 34-2, the input of a command corresponding to the operation content is received, and the operation corresponding to the received command is executed.

The user terminal 33-3 is a television receiver (hereinafter, simply referred to as a television) or the like, and displays the image P11 supplied from the content server 32 on the display unit.

In addition, when various commands are input by a controller 33*a*-3 operated by the users 34-3-1 and 34-3-2, the user terminal 33-3 executes an operation corresponding to the input command.

With such a configuration, an image captured by the imaging device 41 such as a drive recorder mounted on the vehicle 31 is distributed to the user terminal 33 of a user who is not on the vehicle 31 via the content server 32 on the network, thereby providing a virtual drive environment as if a passenger of the vehicle and the user are riding together, enabling voice chat or the like between the passenger of the vehicle 31 and each user 34 of the user terminal 33, and realizing interaction.

At this time, before the vehicle 31 arrives at the destination, the user 34 of the user terminal 33 who is not on board the vehicle 31 may disconnect the communication via the content server 32 and leave the state of receiving the provision of the virtual drive environment, or may connect the communication again and return to the state of receiving the provision of the virtual drive environment.

That is, in the virtual drive environment, the user 34 disconnects the connection state between the user terminal 33 and the vehicle 31 via the content server 32 on the way, or reconnects and returns, so that it is possible to enjoy a virtual drive as if the user is free to get on and off on the way to the destination.

Furthermore, in the real vehicle 31, there is a limitation on the number of passengers that can board, but there is no limitation on the number of user terminals 33 that share the virtual drive environment, and thus, it is possible to provide the virtual drive environment to a large number of users and passengers. As a result, the passenger can perform an activity like a so-called travel guide who guides the moving destination of the vehicle 31 for many users.

Note that the user terminals 33-1 to 33-3, the user 34-1, the user 34-2, and the users 34-3-1 and 34-3-2 are simply referred to as a user terminal 33 and a user 34, respectively, in a case where it is not particularly necessary to distinguish them, and other configurations are also similarly referred to.

Figure 2:
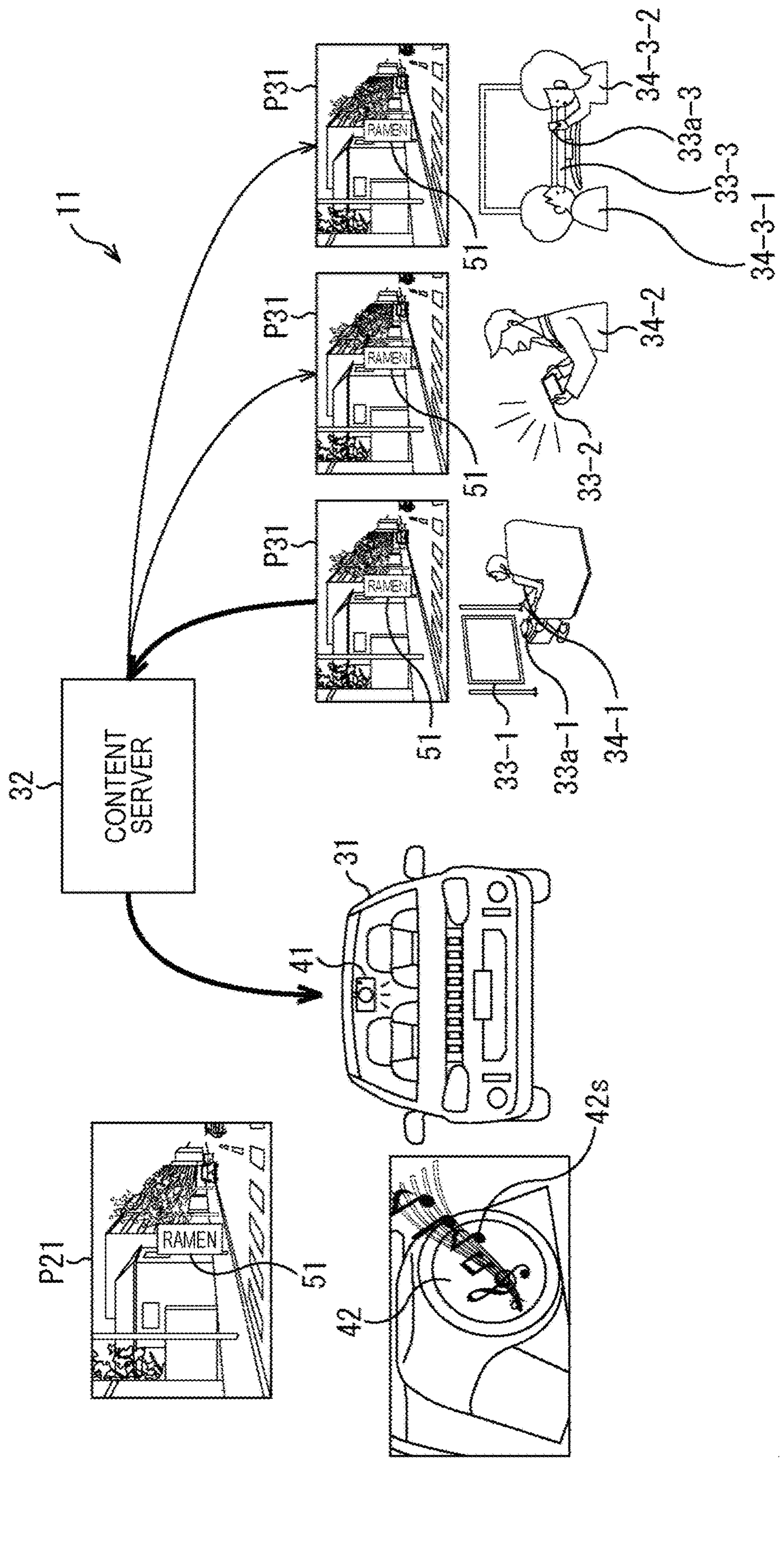
FIG. 2 is a diagram for explaining an outline of a content distribution system of the present disclosure.

Furthermore, as illustrated in FIG. 2, in the content distribution system 11, the user 34 of the user terminal 33 can generate and provide content to be reproduced under a predetermined reproduction condition while the vehicle 31 moves to the destination. As a result, when acquiring the content provided by the user, the vehicle 31 can reproduce the content when a predetermined reproduction condition is satisfied.

Among the arrows connected to the content server 32 in FIG. 2, an arrow whose terminal end is connected to the content server 32 represents that the user 34-1 operates the input means 33*a*-1 to generate content to be reproduced under a predetermined reproduction condition, and uploads the content to the content server 32.

Furthermore, among the arrows connected to the content server 32 in FIG. 2, the arrow connected to the vehicle 31 represents that the content uploaded from the user terminal 33 is transmitted to the vehicle 31 and reproduction is set, and this content is reproduced when a predetermined reproduction condition is satisfied while the vehicle 31 is traveling.

More specifically, for example, it is expressed that, when the user 34-1 passes in front of a predetermined store, for example, a store on a signboard of "ramen" that the user

34-1 wants to introduce while the vehicle 31 is moving, predetermined audio content 42*s* output as audio or a sound effect from the content reproduction unit 42 such as a speaker of the vehicle 31 is edited and generated, and uploaded to the content server 32.

Here, the generated content 42*s* includes audio data output from the content reproduction unit 42 including a speaker and information indicating a reproduction condition for reproducing the audio data. The reproduction condition is a condition indicating a trigger for content reproduction such that the content 42*s* including audio data is output as audio from the content reproduction unit 42 including a speaker.

In this case, recognition of the signboard 51 of "ramen" in the image captured by the imaging device 41 is a reproduction condition of the content 42*s*.

Therefore, when acquiring the content from the content server 32, the content reproduction unit 42 repeats the processing of reading the reproduction condition of the content included in the content described above and determining whether or not the reproduction condition is satisfied.

In a case where the image captured by the imaging device 41 is, for example, an image P21 including a signboard 51 drawn as "ramen" as illustrated in FIG. 2, the reproduction condition of the content is satisfied.

In this way, when determining that the reproduction condition of the content is satisfied, the content reproduction unit 42 reads the stored content 42*s* and outputs the content as audio or a sound effect from the speaker.

As a result, while continuing to move to the destination, the passenger of the vehicle 31 can recognize the timing of passing in front of the store on the signboard of "ramen" recommended by the user 34-1, and for example, if the passenger is interested in the store, the passenger is prompted to stop by the store.

Therefore, the provision of such content can also be treated as advertisement content. That is, a reproduction condition may be set such that the advertiser can recognize the timing of passing in front of a store to be advertised, and content including audio or an image advertising the store may be reproduced to function as advertisement content.

In the setting of the reproduction condition, in addition to being performed by the advertiser itself, the advertiser may register advertisement content as a material in the content server 32 in advance, and the user 34 may select the advertisement content from a list of registered advertisement content and set the reproduction condition.

Note that, in FIG. 2, the image corresponding to the image P21 is also supplied to the user terminals 33-1 to 33-3 via the content server 32, and is displayed as an image P31 corresponding to the image P21.

Through such a series of processing, while providing a virtual drive environment as if the passenger of the vehicle 31 and the user 34 ride together, the passenger can receive provision of content to be reproduced under a predetermined reproduction condition edited by a user who is not on the vehicle 31.

As a result, in providing the virtual drive environment as if the passenger of the vehicle 31 and the user 34 ride together, not only the drive image is unilaterally provided from the vehicle 31 to the user terminal 33, but also the content as described above can be provided from the user terminal 33 to the vehicle 31.

By combining the reproduction condition and the content to be reproduced as described above, various types of interaction are performed in a virtual drive environment as if the passenger of the vehicle 31 and the user 34 who is at a remote location are riding together, and as a result, it leads to sharing of realistic feeling and improvement of sense of unity between the passenger of the vehicle 31 and the user 34.

Note that the content reproduction condition may be not only the above-described condition but also a condition that position information detected by a global positioning system (GPS) or the like built in the vehicle 31 has entered a specific area. For example, it is conceivable that position information detected by a global positioning system (GPS) or the like built in the vehicle 31 reaches a position within a predetermined distance from a predetermined store. The detection of the position information by the GPS is an example, and the detection means is not limited thereto.

Furthermore, the reproduction condition may be, for example, when a predetermined object, a person, or the like is detected in addition to a predetermined display object, such as when a predetermined signboard or road traffic sign is detected by the imaging device 41 as described above, or when an environmental element such as weather, climate (for example, daily illuminance or the amount of raindrops), or brightness is detected. For example, it may be a case where it is recognized that a vehicle of a specific vehicle type is present in the opposite lane, a case where it is recognized that a license plate of an oncoming vehicle is a specific combination of numbers, or the like.

In addition, the element set as the reproduction condition of the content may be, for example, when an in-vehicle imaging device (not illustrated) images the inside of the vehicle 31 on which the passenger boards to recognize an article brought in from the outside of the vehicle by the passenger purchasing the article at a moving destination or the like, or when recognizing a specific motion (including a hand gesture and a body gesture) by the passenger, or when recognizing a voice and making a predetermined utterance. Alternatively, the element may be an imaging action of capturing by operating a shutter button (not illustrated) of the imaging device 41 or the like.

Meanwhile, the content to be reproduced is not limited to audio, and may be any content as long as the content includes elements that can be sensed by five human senses, such as an image using a display or a projector (including augmented reality superimposed on a real space), projection mapping using lighting, light emission performance such as a mirror ball, various vibrations, air blowing, and aroma generation. However, since there is a limitation on content that can be reproduced by the device mounted on the vehicle 31, the provided content needs to be content that can be reproduced by at least the device mounted on the vehicle 31.

<1-2. Content Distribution System of Present Disclosure>

Next, a configuration example of a preferred embodiment of the content distribution system of the present disclosure will be described with reference to a block diagram of FIG. 3.

Figure 3:
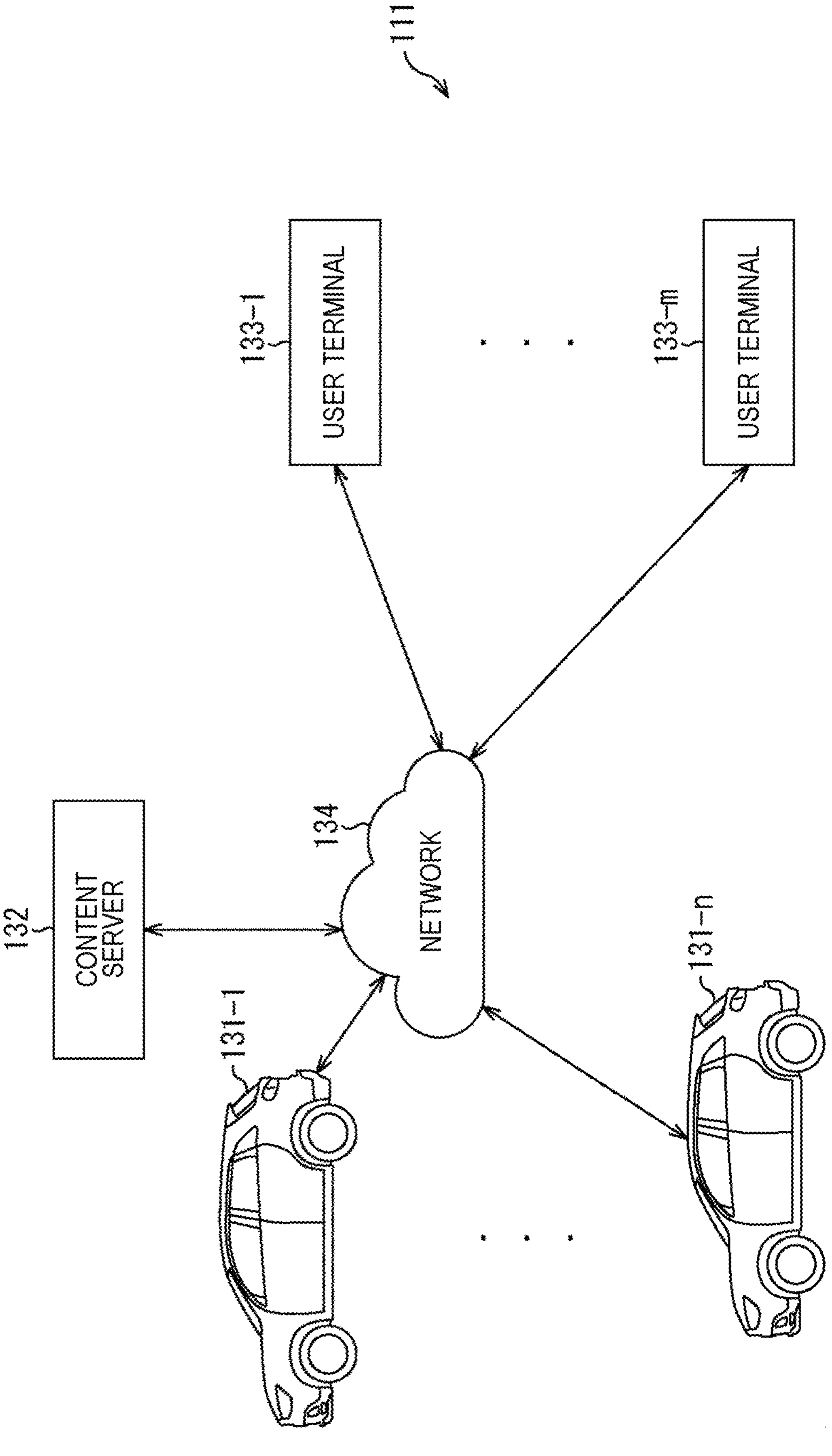
FIG. 3 is a diagram for explaining a configuration example of a preferred embodiment of a content distribution system of the present disclosure.

The content distribution system 111 in FIG. 3 includes vehicles 131-1 to 131-*n*, a content server 132, user terminals 133-1 to 133-*m*, and a network 134. Furthermore, the vehicle 131, the content server 132, and the user terminals 133-1 to 133-*n* can communicate with each other via the network 134.

Note that the vehicles 131-1 to 131-*n*, the content server 132, and the user terminals 133-1 to 133-*m* in the content distribution system 111 in FIG. 3 have configurations corresponding to the vehicle 31, the content server 32, and the user terminal 33 in the content distribution system 11 in FIGS. 1 and 2, respectively.

The vehicle 131 is a moving body that is steered by a passenger or moves to a destination by automated driving, and has a function as a so-called drive radar that captures at least an image ahead from the inside to the outside of the vehicle while traveling and records an imaging result. In addition, the vehicle 131 transmits an image captured to realize a function as a drive recorder to the content server 132 via the network 134 as a drive image.

The content server 132 acquires the drive image supplied from the vehicle 131 via the network 134, and stores the drive image in association with information for identifying the vehicle 131. Then, when distribution of the drive image is requested from any of the user terminals 133-1 to **133-*m* operated by a user who is not on board the vehicle 131, the content server 132 generates a vehicle list by listing information for identifying the vehicle 131 registered in association with the drive image, and supplies the vehicle list to the user terminal 133** requesting the distribution of the drive image.

The user terminal 133 acquires the vehicle list supplied from the content server 132, presents the vehicle list to the user, and transmits, to the content server 132, information for specifying the vehicle 131 requested to distribute the drive image selected on the basis of the operation of the user.

The content server 132 distributes the drive image registered in association to the user terminal 133 on the basis of the information specifying the vehicle 131 supplied from the user terminal 133.

The user terminal 133 receives and displays the drive image captured by the vehicle 131 identified by itself and distributed from the content server 132.

In this way, in a case where the drive image is shared between the vehicle 131 and the user terminal 133, the passenger of the vehicle 131 and the user of the user terminal 133 can communicate with each other, and real-time communication through, for example, voice chat or the like can be performed.

Furthermore, the user terminal 133 can edit or select the content to be reproduced under a predetermined reproduction condition via the content server 132 while viewing the drive image, and can provide the content package to the vehicle 131.

Here, the content package to be provided to the vehicle 131 includes, for example, at least one reproduction condition and at least one content to be reproduced in correspondence with the at least one reproduction condition so that a specific audio (music, alarm sound, sound effect, and the like) is output when the reproduction condition is satisfied at the timing of passing in front of the ramen shop described above.

Note that the content may be other than voice. For example, the content may be at least one of an image displayed on a display (including a moving image, a still image, a slide of a still image, and the like), a projection image projected on a window, a ceiling, or the like using a projector or the like, an augmented reality (AR) image superimposed on a real space, performance by vibration, lighting performance such that brightness or color emitted by a lighting fixture is changed in a predetermined rhythm, air blowing (including performance by changing an air volume and a wind direction), and aroma generation (including aroma generation performance for switching and outputting an odor having different scents or a combination thereof), a game (games such as quizzes, word chain, and singing) in which a user of another user terminal 133 or a passenger of the vehicle 131 can participate, or a combination thereof.

For example, in a case where the content to be reproduced when the reproduction condition is satisfied is a combination of a plurality of contents such as a projection image and lighting performance, when one reproduction condition is satisfied, the projection of the image and the lighting effects are reproduced simultaneously or sequentially. However, the content is limited to content of a type that can be output by a content output unit 165 (FIG. 4) mounted on the vehicle 131.

When receiving a request for creating a content package from the user terminal 133, the content server 132 transmits a content material list in which reproduction conditions and contents necessary for creating the content package are listed to the user terminal 133.

The user terminal 133 presents the content material list supplied from the content server 132, prompts generation of a content package by editing using a reproduction condition and a content material, receives an operation input of freely combining the reproduction condition and the content, and generates the content package. For example, the content package may be configured by a combination of a plurality of reproduction conditions and a plurality of contents such that the contents A and B are reproduced simultaneously or sequentially with respect to the reproduction condition A, and the contents C, D, and E are reproduced simultaneously or sequentially with respect to the reproduction condition B.

Note that, at this time, the user terminal 133 prompts the input of the reproduction condition of the content, and supplies the content server 132 as a content package in which the information of the reproduction condition of the content input on the basis of the operation input of the user is associated with the content to be reproduced.

The content server 132 acquires the content package generated in the user terminal 133 and transmits the content package to the vehicle 131.

Upon receiving the content package transmitted from the content server 132, the vehicle 131 stores the content package, reads the information on the reproduction condition of the content, and determines whether or not the reproduction condition of the content is satisfied in the subsequent travel to the destination. Then, when the reproduction condition of the content is satisfied, the vehicle 131 reproduces the stored content.

With the above configuration, in the content distribution system 111 of FIG. 3, the image captured by the camera such as the drive recorder mounted on the vehicle 131 is distributed to the user terminal 133 of the user who is not on the vehicle 131 via the content server 132 on the network, so that it is possible to provide the virtual drive environment as if the passenger of the vehicle and the user are riding together.

At this time, the user terminal 133 not riding in the vehicle 131 may disconnect the communication via the content server 132 and leave the state of receiving the provision of the virtual drive environment before the vehicle 131 arrives at the destination, or may connect the communication again and return to the state of receiving the provision of the virtual drive environment.

Furthermore, in the real vehicle 131, there is a limitation on the number of passengers that can board, but there is no limitation on the number of user terminals 133 that share the virtual drive environment, and thus, it is possible to provide the virtual drive environment to a larger number of users and passengers. As a result, for example, the passenger can realize an activity such as a so-called travel guide who guides the moving destination of the vehicle 131 for many users.

Furthermore, in providing the virtual drive environment as if the passenger of the vehicle 131 and the user of the user terminal 133 ride in the same vehicle 131, not only the drive image is unilaterally provided from the vehicle 131 to the user terminal 133, but also the content as described above can be provided from the user of the user terminal 133 to the vehicle 131.

By combining the reproduction condition and the content to be reproduced as described above, various types of interaction are performed in the virtual drive environment as if the passenger of the vehicle 31 and the user 34 who is remote are riding together, and as a result, in providing the virtual drive environment, the user of the user terminal 133 can provide the content to be reproduced under the predetermined reproduction condition to the passenger of the vehicle 131.

Note that although the vehicle 131 is used as an example of a moving body in the example of FIG. 3, any other moving body may be used as long as the moving body moves to a destination with a passenger on board, and the moving body may be, for example, a railway, an aircraft, a drone, a ship, a mobile robot, or the like.

<1-3. Configuration Example of Vehicle Control System>

Figure 4:
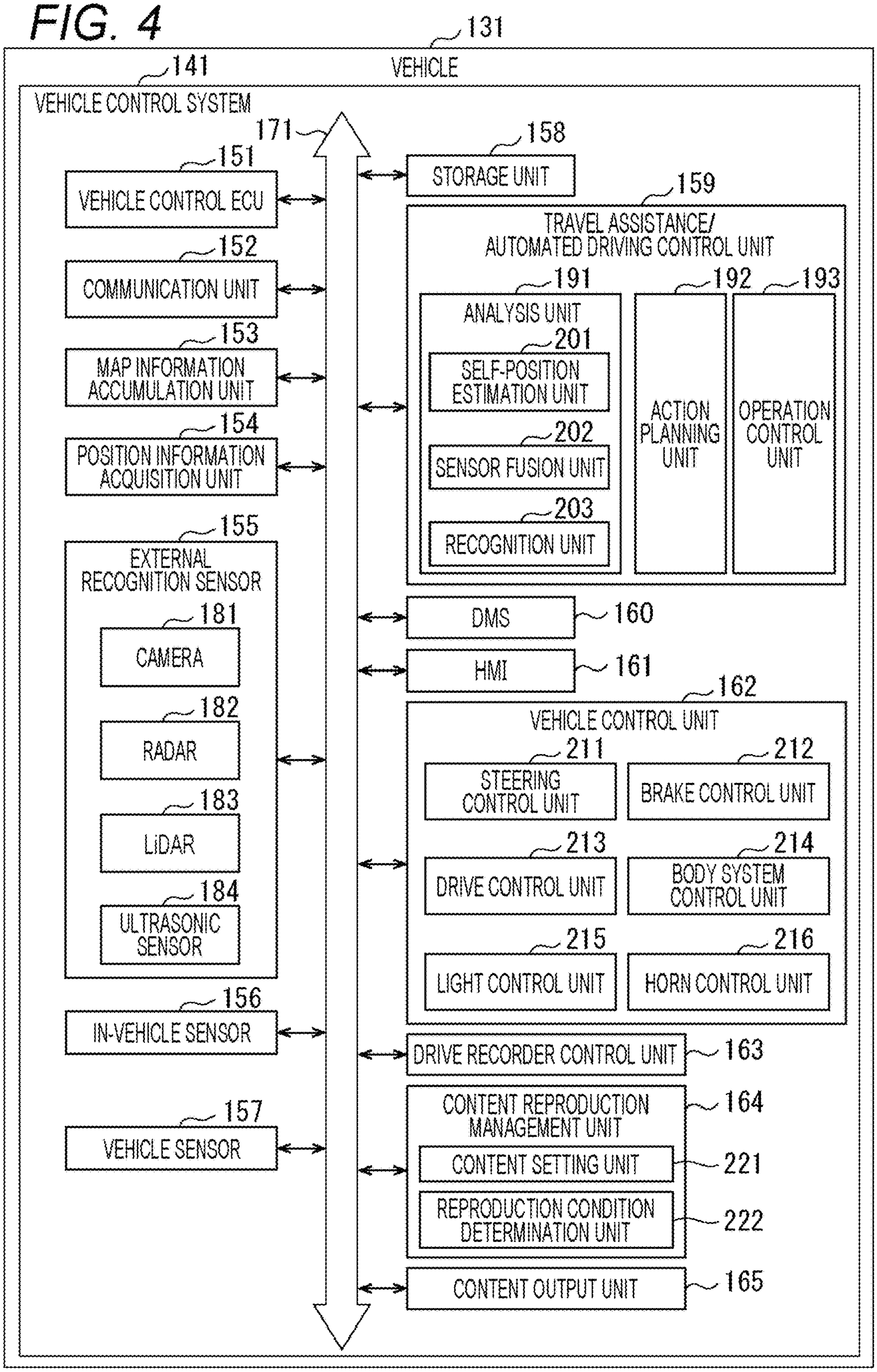
FIG. 4 is a block diagram illustrating a configuration example of a vehicle control system that controls the vehicle of FIG. 3.

Next, referring to FIG. 4, it is a block diagram illustrating a configuration example of a vehicle control system 141 which is an example of a mobile device control system to which the present disclosure is applied.

The vehicle control system 141 is provided in the vehicle 131 and performs processing related to travel assistance and automated driving of the vehicle 131.

The vehicle control system 141 includes a vehicle control electronic control unit (ECU) 151, a communication unit 152, a map information accumulation unit 153, a position information acquisition unit 154, an external recognition sensor 155, an in-vehicle sensor 156, a vehicle sensor 157, a storage unit 158, a travel assistance/automated driving control unit 159, a driver monitoring system (DMS) 160, a human machine interface (HMI) 161, a vehicle control unit 162, a drive recorder control unit 163, a content reproduction management unit 164, and a content output unit 165.

The vehicle control ECU 151, the communication unit 152, the map information accumulation unit 153, the position information acquisition unit 154, the external recognition sensor 155, the in-vehicle sensor 156, the vehicle sensor 157, the storage unit 158, the travel assistance/automated driving control unit 159, the driver monitoring system (DMS) 160, the human machine interface (HMI) 161, the vehicle control unit 162, the drive recorder control unit 163, the content reproduction management unit 164, and the content output unit 165 are communicably connected to each other via a communication network 171. The communication network 171 includes, for example, an in-vehicle communication network, a bus, or the like conforming to a digital bidirectional communication standard such as a controller area network (CAN), a local interconnect network (LIN), a local area network (LAN), FlexRay (registered trademark), or Ethernet (registered trademark). The communication network 171 may be selectively used depending on the type of data to be transmitted. For example, the CAN may be applied to data related to vehicle control, and the Ethernet may be applied to large-volume data. Note that each unit of the vehicle control system 141 may be directly connected not via the communication network 171 but by using wireless communication that assumes communication at a relatively short distance, such as near field communication (NFC) or Bluetooth (registered trademark).

Note that, hereinafter, in a case where each unit of the vehicle control system 141 performs communication via the communication network 171, description of the communication network 171 will be omitted. For example, in a case where the vehicle control ECU 151 and the communication unit 152 perform communication via the communication network 171, it is simply described that the vehicle control ECU 151 and the communication unit 152 perform communication.

The vehicle control ECU 151 includes, for example, various processors such as a central processing unit (CPU) and a micro processing unit (MPU). The vehicle control ECU 151 controls the entire or partial function of the vehicle control system 141.

The communication unit 152 communicates with various devices inside and outside the vehicle, other vehicles, servers, base stations, and the like, and transmits and receives various data. At this time, the communication unit 152 can perform communication using a plurality of communication methods.

Communication with the outside of the vehicle executable by the communication unit 152 will be schematically described. The communication unit 152 communicates with, for example, a server (hereinafter, referred to as an external server) or the like existing on an external network via a base station or an access point by a wireless communication method such as 5th generation mobile communication system (5G), long term evolution (LTE), or dedicated short range communications (DSRC). The external network with which the communication unit 152 performs communication is, for example, the Internet, a cloud network, a network unique to an operator, or the like. The communication method performed by the communication unit 152 with respect to the external network is not particularly limited as long as it is a wireless communication method capable of performing digital bidirectional communication at a communication speed equal to or higher than a predetermined speed and at a distance equal to or longer than a predetermined distance.

Furthermore, for example, the communication unit 152 can communicate with a terminal existing in the vicinity of the host vehicle using a peer to peer (P2P) technology. The terminal present in the vicinity of the host vehicle is, for example, a terminal attached to a moving body moving at a relatively low speed such as a pedestrian or a bicycle, a terminal fixedly installed in a position of a store or the like, or a machine type communication (MTC) terminal. Furthermore, the communication unit 152 can also perform V2X communication. The V2X communication refers to, for example, communication between the host vehicle and another vehicle, such as vehicle to vehicle communication with another vehicle, vehicle to infrastructure communication with a roadside device or the like, vehicle to home communication, and vehicle to pedestrian communication with a terminal or the like carried by a pedestrian.

For example, the communication unit 152 can receive a program for updating software for controlling the operation of the vehicle control system 141 from the outside (Over The Air). The communication unit 152 can further receive map information, traffic information, information around the vehicle 131, and the like from the outside. Furthermore, for example, the communication unit 152 can transmit information regarding the vehicle 131, information around the vehicle 131, and the like to the outside. Examples of the information regarding the vehicle 131 transmitted to the outside by the communication unit 152 include data indicating the state of the vehicle 131, a recognition result by the recognition unit 203, and the like. Furthermore, for example, the communication unit 152 performs communication corresponding to a vehicle emergency call system such as an eCall.

For example, the communication unit 152 receives an electromagnetic wave transmitted by a road traffic information communication system (vehicle information and communication system (VICS) registered trademark) such as a radio wave beacon, an optical beacon, or FM multiplex broadcasting.

Communication with the inside of the vehicle executable by the communication unit 152 will be schematically described. The communication unit 152 can communicate with each device in the vehicle using, for example, wireless communication. The communication unit 152 can perform, for example, wireless communication with an in-vehicle device by a communication method capable of performing digital bidirectional communication at a predetermined communication speed or higher by wireless communication, such as wireless LAN, Bluetooth, NFC, or wireless USB (WUSB). The present invention is not limited thereto, and the communication unit 152 can also communicate with each device in the vehicle using wired communication. For example, the communication unit 152 can communicate with each device in the vehicle by wired communication via a cable connected to a connection terminal (not illustrated). The communication unit 152 can communicate with, for example, each device in the vehicle by a communication method capable of performing digital bidirectional communication at a predetermined communication speed or higher by wired communication, such as universal serial bus (USB), high-definition multimedia interface (HDMI) (registered trademark), or mobile high-definition link (MHL).

Here, the in-vehicle device refers to, for example, a device that is not connected to the communication network 171 in the vehicle. Possible examples of the device in the vehicle include a mobile device and a wearable device carried by a passenger such as a driver, an information device brought into the vehicle and temporarily installed, and the like.

The map information accumulation unit 153 accumulates one or both of a map acquired from the outside and a map created by the vehicle 131. For example, the map information accumulation unit 153 accumulates a three-dimensional high-precision map, a global map having lower accuracy than the high-precision map and covering a wide area, and the like.

Examples of the high-precision map include a dynamic map, a point cloud map, a vector map, and the like. The dynamic map is, for example, a map including four layers of dynamic information, semi-dynamic information, semi-static information, and static information, and is provided to the vehicle 131 from an external server or the like. The point cloud map is a map including point clouds (point cloud data). The vector map is, for example, a map in which traffic information such as a lane and a position of a traffic light is associated with a point cloud map and adapted to an advanced driver assistance system (ADAS) or autonomous driving (AD).

The point cloud map and the vector map may be provided from, for example, an external server or the like, or may be created by the vehicle 131 as a map for performing matching with a local map to be described later on the basis of a sensing result by the camera 181, the radar 182, the LiDAR 53, or the like, and may be accumulated in the map information accumulation unit 153. Furthermore, in a case where a high-precision map is provided from an external server or the like, for example, map data of several hundred meters square regarding a planned route on which the vehicle 131 will travel is acquired from an external server or the like in order to reduce the communication capacity.

The position information acquisition unit 154 receives a global navigation satellite system (GNSS) signal from a GNSS satellite, and acquires position information of the vehicle 131. The acquired position information is supplied to the travel assistance/automated driving control unit 159. Note that the position information acquisition unit 154 is not limited to the method using the GNSS signal, and may acquire the position information using, for example, a beacon.

The external recognition sensor 155 includes various sensors used for recognizing a situation outside the vehicle 131, and supplies sensor data from each sensor to each unit of the vehicle control system 141. The type and number of sensors included in the external recognition sensor 155 are arbitrary.

For example, the external recognition sensor 155 includes a camera 181, a radar 182, a light detection and ranging or laser imaging detection and ranging (LiDAR) 183, and an ultrasonic sensor 184. The present invention is not limited thereto, and the external recognition sensor 155 may include one or more types of sensors among the camera 181, the radar 182, the LiDAR 183, and the ultrasonic sensor 184. The number of the cameras 181, the radars 182, the LiDAR 183, and the ultrasonic sensors 184 is not particularly limited as long as it is a number that can be practically installed in the vehicle 131. Furthermore, the type of sensor included in the external recognition sensor 155 is not limited to this example, and the external recognition sensor 155 may include another type of sensor. An example of the sensing region of each sensor included in the external recognition sensor 155 will be described later.

Note that an imaging method of the camera 181 is not particularly limited. For example, cameras of various imaging methods such as a time of flight (ToF) camera, a stereo camera, a monocular camera, and an infrared camera, which are imaging methods capable of distance measurement, can be applied to the camera 181 as necessary. The present invention is not limited thereto, and the camera 181 may simply acquire a captured image regardless of distance measurement.

Furthermore, for example, the external recognition sensor 155 can include an environment sensor for detecting the environment for the vehicle 131. The environment sensor is a sensor for detecting an environment such as weather, climate, and brightness and can include various sensors such as a raindrop sensor, a fog sensor, a sunshine sensor, a snow sensor, and an illuminance sensor, for example.

Furthermore, for example, the external recognition sensor 155 includes a microphone used for detecting a sound around the vehicle 131, a position of a sound source, and the like.

The in-vehicle sensor 156 includes various sensors for detecting information inside the vehicle, and supplies sensor data from each sensor to each unit of the vehicle control system 141. The type and number of various sensors included in the in-vehicle sensor 156 are not particularly limited as long as they are types and numbers that can be practically installed in the vehicle 131.

For example, the in-vehicle sensor 156 can include one or more sensors of a camera, a radar, a seating sensor, a steering wheel sensor, a microphone, and a biological sensor. As the camera included in the in-vehicle sensor 156, for example, cameras of various imaging methods capable of measuring a distance, such as a ToF camera, a stereo camera, a monocular camera, and an infrared camera, can be used. The present invention is not limited thereto, and the camera included in the in-vehicle sensor 156 may simply acquire a captured image regardless of distance measurement. The biological sensor included in the in-vehicle sensor 156 is provided, for example, on a seat, a steering wheel, or the like, and detects various types of biological information of a passenger such as a driver.

The vehicle sensor 157 includes various sensors for detecting the state of the vehicle 131, and supplies sensor data from each sensor to each unit of the vehicle control system 141. The type and number of various sensors included in the vehicle sensor 157 are not particularly limited as long as they are types and numbers that can be practically installed in the vehicle 131.

For example, the vehicle sensor 157 includes a speed sensor, an acceleration sensor, an angular velocity sensor (gyro sensor), and an inertial measurement unit (IMU) integrating these sensors. For example, the vehicle sensor 157 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 157 includes a rotation sensor that detects the rotation speed of the engine or the motor, an air pressure sensor that detects the air pressure of the tire, a slip rate sensor that detects the slip rate of the tire, and a wheel speed sensor that detects the rotation speed of the wheel. For example, the vehicle sensor 157 includes a battery sensor that detects a remaining amount and a temperature of a battery, and an impact sensor that detects an external impact.

The storage unit 158 includes at least one of a nonvolatile storage medium or a volatile storage medium, and stores data and a program. The storage unit 158 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as the storage medium. The storage unit 158 stores various programs and data used by each unit of the vehicle control system 141. For example, the storage unit 158 includes an event data recorder (EDR) and a data storage system for automated driving (DSSAD), and stores information of the vehicle 131 before and after an event such as an accident and information acquired by the in-vehicle sensor 156.

The travel assistance/automated driving control unit 159 controls travel assistance and automated driving of the vehicle 131. For example, the travel assistance/automated driving control unit 159 includes an analysis unit 191, an action planning unit 192, and an operation control unit 193.

The analysis unit 191 performs analysis processing of the vehicle 131 and the surrounding situation. The analysis unit 191 includes a self-position estimation unit 201, a sensor fusion unit 202, and a recognition unit 203.

The self-position estimation unit 201 estimates the self-position of the vehicle 131 on the basis of the sensor data from the external recognition sensor 155 and the high-precision map accumulated in the map information accumulation unit 153. For example, the self-position estimation unit 201 generates a local map on the basis of sensor data from the external recognition sensor 155, and estimates the self-position of the vehicle 131 by matching the local map with the high-precision map. The position of the vehicle 131 is based on, for example, the center of the rear wheel pair axle.

The local map is, for example, a three-dimensional high-precision map created using a technology such as simultaneous localization and mapping (SLAM), an occupancy grid map, or the like. Examples of the three-dimensional high-precision map include the above-described point cloud map and the like. The occupancy grid map is a map that divides a three-dimensional or two-dimensional space around the vehicle 131 into grids (grids) of a predetermined size and indicates an occupancy state of an object in units of grids. The occupancy state of the object is represented by, for example, presence or absence or an existence probability of the object. The local map is also used for detection processing and recognition processing of a situation outside the vehicle 131 by the recognition unit 203, for example.

Note that the self-position estimation unit 201 may estimate the self-position of the vehicle 131 on the basis of the position information acquired by the position information acquisition unit 154 and the sensor data from the vehicle sensor 157.

The sensor fusion unit 202 performs sensor fusion processing of combining a plurality of different types of sensor data (for example, image data supplied from the camera 181 and sensor data supplied from the radar 182) to obtain new information. Methods for combining different types of sensor data include integration, fusion, association, and the like.

The recognition unit 203 executes detection processing for detecting a situation outside the vehicle 131 and recognition processing for recognizing a situation outside the vehicle 131.

For example, the recognition unit 203 performs detection processing and recognition processing of a situation outside the vehicle 131 on the basis of information from the external recognition sensor 155, information from the self-position estimation unit 201, information from the sensor fusion unit 202, and the like.

Specifically, for example, the recognition unit 203 performs detection processing, recognition processing, and the like of an object around the vehicle 131. The object detection processing is, for example, processing of detecting presence or absence, a size, a shape, a position, a motion, and the like of an object. The object recognition processing is, for example, processing of recognizing an attribute such as a type of an object or identifying a specific object. The detection processing and the recognition processing, however, are not necessarily clearly separated and may overlap.

For example, the recognition unit 203 detects an object around the vehicle 131 by performing clustering to classify point clouds based on sensor data by the radar 182, the LiDAR 183, or the like into clusters of point clouds. As a result, the presence or absence, size, shape, and position of an object around the vehicle 131 are detected.

For example, the recognition unit 203 detects the motion of the object around the vehicle 131 by performing tracking that follows the motion of the mass of the point cloud classified by clustering. As a result, the speed and the traveling direction (movement vector) of the object around the vehicle 131 are detected.

For example, the recognition unit 203 detects or recognizes a vehicle, a person, a bicycle, an obstacle, a structure, a road, a traffic light, a traffic sign, a road sign, and the like on the basis of the image data supplied from the camera 181. Furthermore, the recognition unit 203 may recognize the type of the object around the vehicle 131 by performing recognition processing such as semantic segmentation.

For example, the recognition unit 203 can perform recognition processing of traffic rules around the vehicle 131 on the basis of a map accumulated in the map information accumulation unit 153, an estimation result of the self-position by the self-position estimation unit 201, and a recognition result of an object around the vehicle 131 by the recognition unit 203. Through this process, the recognition unit 203 can recognize the position and the state of the traffic light, the contents of the traffic sign and the road sign, the contents of the traffic regulation, the travelable lane, and the like.

For example, the recognition unit 203 can perform recognition processing of the environment around the vehicle 131. As the surrounding environment to be recognized by the recognition unit 203, weather, temperature, humidity, brightness, a state of a road surface, and the like are assumed.

The action planning unit 192 creates an action plan of the vehicle 131. For example, the action planning unit 192 creates an action plan by performing processing of global path planning and path following.

Note that the global path planning is processing of planning a rough path from a start to a goal. This global path planning is called a track plan, and includes processing of performing local path planning that enables safe and smooth traveling in the vicinity of the vehicle 131 in consideration of the motion characteristics of the vehicle 131 in the planned route.

The path following is processing of planning an operation for safe and accurate travel along a path planned by means of the global path planning within a planned time. For example, the action planning unit 192 can calculate the target speed and the target angular velocity of the vehicle 131 on the basis of the result of the path following processing.

The operation control unit 193 controls the operation of the vehicle 131 in order to realize the action plan created by the action planning unit 192.

For example, the operation control unit 193 controls the steering control unit 211, the brake control unit 212, and the drive control unit 213 included in the vehicle control unit 162 to be described later, and performs acceleration/deceleration control and direction control such that the vehicle 131 travels on the track calculated by the track plan. For example, the operation control unit 193 performs cooperative control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the operation control unit 193 performs cooperative control for the purpose of automated driving or the like in which the vehicle autonomously travels without depending on the operation of the driver.

The DMS 160 performs authentication processing of the driver, recognition processing of the state of the driver, and the like on the basis of sensor data from the in-vehicle sensor 156, input data input to the HMI 161 to be described later, and the like. Possible examples of the state of the driver to be recognized include a physical condition, an alertness level, a concentration level, a fatigue level, a line-of-sight direction, a drunkenness level, a driving operation, a posture, and the like.

Note that the DMS 160 may perform authentication processing of a passenger other than the driver and recognition processing of the state of the passenger. Furthermore, for example, the DMS 160 may perform recognition processing of the situation inside the vehicle on the basis of sensor data from the in-vehicle sensor 156. Possible examples of the situation inside the vehicle to be recognized include temperature, humidity, brightness, odor, and the like.

The HMI 161 inputs various data, instructions, and the like, and presents various data to the driver and the like.

Data input by the HMI 161 will be schematically described. The HMI 161 includes an input device for a person to input data. The HMI 161 generates an input signal on the basis of data, an instruction, or the like input by an input device, and supplies the input signal to each unit of the vehicle control system 141. The HMI 161 includes an operator such as a touch panel, a button, a switch, and a lever as an input device. The present invention is not limited thereto, and the HMI 161 may further include an input device capable of inputting information by a method other than manual operation by voice, gesture, or the like. Furthermore, the HMI 161 may use, for example, a remote control device using infrared rays or radio waves, or an external connection device such as a mobile device or a wearable device corresponding to the operation of the vehicle control system 141 as an input device.

Presentation of data by the HMI 161 will be schematically described. The HMI 161 generates visual information, auditory information, and tactile information for the passenger or the outside of the vehicle. In addition, the HMI 161 performs output control for controlling output, output content, output timing, output method, and the like of each piece of generated information. The HMI 161 generates and outputs, for example, an operation screen, a state display of the vehicle 131, a warning display, an image such as a monitor image indicating a situation around the vehicle 131, and information indicated by light as the visual information. Further, the HMI 161 generates and outputs information indicated by sounds such as voice guidance, a warning sound, and a warning message, for example, as the auditory information. Further, the HMI 161 generates and outputs, as the tactile information, information given to the tactile sense of the passenger by, for example, force, vibration, motion, or the like.

As an output device that the HMI 161 outputs visual information, for example, a display device that presents visual information by displaying an image by itself or a projector device that presents visual information by projecting an image can be applied. Note that the display device may be, for example, a device that displays the visual information in the field of view of the passenger, such as a head-up display, a transmissive display, or a wearable device having an augmented reality (AR) function, as well as a display device having a normal display. In addition, in the HMI 161, a display device included in a navigation device, an instrument panel, a camera monitoring system (CMS), an electronic mirror, a lamp, or the like provided in the vehicle 131 can also be used as an output device that outputs visual information.

As an output device from which the HMI 161 outputs the auditory information, for example, an audio speaker, a headphone, or an earphone can be applied.

As an output device to which the HMI 161 outputs tactile information, for example, a haptic element using a haptic technology can be applied. The haptics element is provided, for example, at a portion with which a passenger of the vehicle 131 comes into contact, such as a steering wheel or a seat.

The vehicle control unit 162 controls each unit of the vehicle 131. The vehicle control unit 162 includes a steering control unit 211, a brake control unit 212, a drive control unit 213, a body system control unit 214, a light control unit 215, and a horn control unit 216.

The steering control unit 211 detects and controls the state of a steering system of the vehicle 131 and the like. The steering system includes, for example, a steering mechanism including a steering wheel and the like, an electric power steering, and the like. The steering control unit 211 includes, for example, a steering ECU that controls a steering system, an actuator that drives the steering system, and the like.

The brake control unit 212 detects and controls the state of the brake system of the vehicle 131 and the like. The brake system includes, for example, a brake mechanism including a brake pedal and the like, an antilock brake system (ABS), a regenerative brake mechanism, and the like. The brake control unit 212 includes, for example, a brake ECU that controls a brake system, an actuator that drives the brake system, and the like.

The drive control unit 213 detects and controls the state of the drive system of the vehicle 131 and the like. The drive system includes, for example, an accelerator pedal, a driving force generation device for generating a driving force such as an internal combustion engine or a driving motor, a driving force transmission mechanism for transmitting the driving force to wheels, and the like. The drive control unit 213 includes, for example, a drive ECU that controls the drive system, an actuator that drives the drive system, and the like.

The body system control unit 214 detects and controls the state of the body system of the vehicle 131 and the like. The body system includes, for example, a keyless entry system, a smart key system, a power window device, a power seat, an air conditioner, an airbag, a seat belt, a shift lever, and the like. The body system control unit 214 includes, for example, a body system ECU that controls the body system, an actuator that drives the body system, and the like.

The light control unit 215 detects and controls states of various lights of the vehicle 131 and the like. Possible examples of the lights to be controlled include a headlight, a backlight, a fog light, a turn signal, a brake light, a projection light, a bumper indicator, and the like. The light control unit 215 includes a light ECU that controls light, an actuator that drives light, and the like.

The horn control unit 216 detects and controls the state of the car horn of the vehicle 131 and the like. The horn control unit 216 includes, for example, a horn ECU that controls a car horn, an actuator that drives the car horn, and the like.

The drive recorder control unit 163 causes the camera 181 of the external recognition sensor 155, the camera of the in-vehicle sensor 156, and the like to record images of the outside and the inside of the vehicle including at least an image of the front during traveling in the storage unit 158, thereby implementing a function as a so-called drive recorder. In addition, when functioning as a drive recorder, the drive recorder control unit 163 controls the communication unit 152 to transmit an image captured by the camera 181, the camera of the in-vehicle sensor 156, or the like as a drive image to the content server 132. At this time, since the position information acquisition unit 154 acquires the position information in time series, the drive recorder control unit 163 transmits the position information in time series corresponding to the drive image to the content server 132.

The content reproduction management unit 164 controls the communication unit 152 to acquire the content package transmitted from the user terminal 133 via the content server 132 and stores the content package in the storage unit 158, and controls the content output unit 165 to reproduce the content when the reproduction condition of the content is satisfied.

More specifically, the content reproduction management unit 164 includes a content setting unit 221 and a reproduction condition determination unit 222.

The content setting unit 221 controls the communication unit 152 to receive the content package from the user terminal 133 via the content server 132, read the content data to be reproduced and the information on the reproduction condition of the content, store the content data and the information on the reproduction condition in the storage unit 158, and supply the information on the reproduction condition to the reproduction condition determination unit 222.

Furthermore, the content setting unit 221 discriminates the type of the device of the content output unit 165 used for reproduction on the basis of the content data, and reproduces and outputs the content from the corresponding device on the basis of the discrimination result.

Further, when the reproduction condition determination unit 222 notifies that the reproduction condition is satisfied, the content setting unit 221 reads the content data stored in the storage unit 158 and controls the content output unit 165 to reproduce and output the content.

The reproduction condition determination unit 222 acquires the information on the reproduction condition of the content supplied from the content setting unit 221.

The reproduction condition determination unit 222 determines whether or not the reproduction condition of the content is satisfied on the basis of at least one of various sensing results of the position information acquisition unit 154, the external recognition sensor 155, the in-vehicle sensor 156, the vehicle sensor 157, or the like, the object recognition result recognized by the recognition unit 203 of the analysis unit 191 in the travel assistance/automated driving control unit 159, and when determining that the condition satisfies the reproduction condition of the content, notifies the content setting unit 221 of the determination.

The content output unit 165 is controlled by the content setting unit 221 of the content reproduction management unit 164, and reproduces and outputs the corresponding content on the basis of the content data supplied in a state where the reproduction condition of the content is satisfied.

The content output unit 165 includes a device corresponding to the type of content, and includes, for example, at least one of various display devices such as a speaker for audio output, a display that outputs and displays an image (moving images, still images, augmented reality (AR) images, game images, and the like), a head-up display, a road surface projection irradiation device, a rear seat monitor, a tail lamp, or a projector that projects an image on a side window or a rear window, or various audio output devices such as a plurality of speakers corresponding to contents of an image, a game, music, a sound, a still image, and the like, and a vibrator that generates vibration.

In addition, the content output unit 165 may include a lighting device (including, but is not limited to, a projector, a mirror ball, and the like) for performing lighting performance that changes brightness and color of emitted light, a blower device for realizing performance by changing an air volume and a wind direction, an aroma generation device that outputs aroma, and the like.

Note that, regarding the configuration in the content output unit 165, a configuration that can be substituted with the HMI 161 or the like according to the type of content may be configured so as not to overlap.

Figure 5:
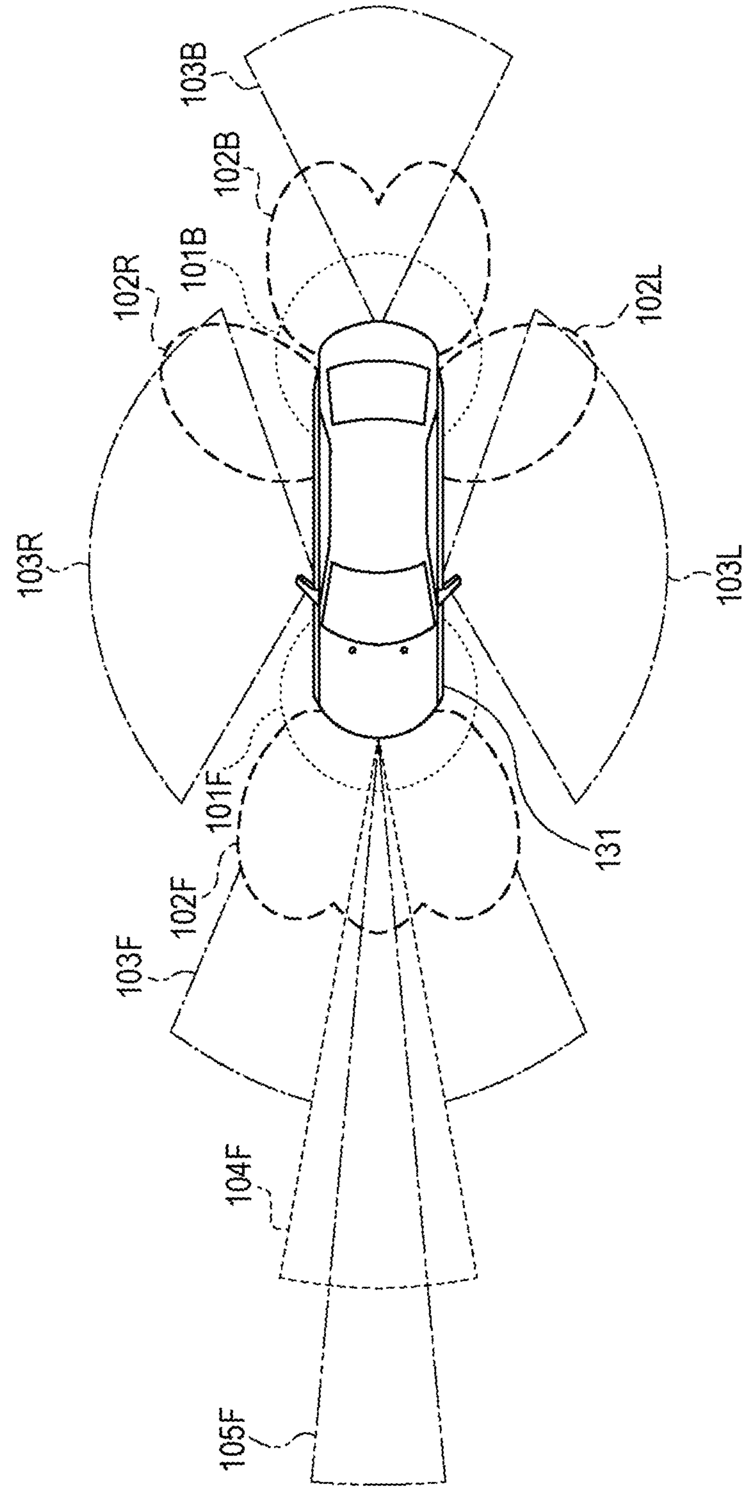
FIG. 5 is a diagram illustrating an example of sensing regions.

FIG. 5 is a diagram illustrating an example of a sensing region by the camera 181, the radar 182, the LiDAR 183, the ultrasonic sensor 184, and the like of the external recognition sensor 155 in FIG. 4. Note that FIG. 5 schematically illustrates a state in which the vehicle 131 is viewed from above, in which a left end side is a front end (front) side of the vehicle 131 and a right end side is a rear end (rear) side of the vehicle 131.

The sensing region 101F and the sensing region 101B illustrate examples of the sensing region of the ultrasonic sensor 184. The sensing region 101F covers the periphery of the front end of the vehicle 131 by the plurality of ultrasonic sensors 184. The sensing region 101B covers the periphery of the rear end of the vehicle 131 by the plurality of ultrasonic sensors 184.

The sensing results in the sensing region 101F and the sensing region 101B are used, for example, for parking assistance of the vehicle 131.

The sensing regions 102F to 102B illustrate examples of sensing regions of the radar 182 for a short distance or a middle distance. The sensing region 102F covers a position farther than the sensing region 101F in front of the vehicle 131. The sensing region 102B covers a position farther than the sensing region 101B behind the vehicle 131. The sensing region 102L covers the rear periphery of the left side surface of the vehicle 131. The sensing region 102R covers the rear periphery of the right side surface of the vehicle 131.

The sensing result in the sensing region 102F is used, for example, to detect a vehicle, a pedestrian, or the like existing in front of the vehicle 131. The sensing result in the sensing region 102B is used, for example, for a collision prevention function or the like behind the vehicle 131. The sensing results in the sensing region 102L and the sensing region 102R are used, for example, for detecting an object in a blind spot on the side of the vehicle 131.

The sensing regions 103F to 103B illustrate examples of sensing regions by the camera 181. The sensing region 103F covers a position farther than the sensing region 102F in front of the vehicle 131. The sensing region 103B covers a position farther than the sensing region 102B behind the vehicle 131. The sensing region 103L covers the periphery of the left side surface of the vehicle 131. The sensing region 103R covers the periphery of the right side surface of the vehicle 131.

A sensing result in the sensing region 103F can be used for, for example, recognition of a traffic light or a traffic sign, a lane departure prevention assist system, and an automatic headlight control system. A sensing result in the sensing region 103B is used for, for example, parking assistance, a surround view system, and the like. Sensing results in the sensing regions 103L and 103R can be used for, for example, a surround view system.

The sensing region 104F illustrates an example of a sensing region of the LiDAR 183. The sensing region 104F covers a position farther than the sensing region 103F in front of the vehicle 131. Meanwhile, the sensing region 104F has a narrower range in the left-right direction than the sensing region 103F.

The sensing result in the sensing region 104F is used, for example, for detecting an object such as a surrounding vehicle.

The sensing region 105F illustrates an example of a sensing region of the long-range radar 182. The sensing region 105F covers a position farther than the sensing region 104F in front of the vehicle 131. Meanwhile, the sensing region 105F has a narrower range in the left-right direction than the sensing region 104F.

The sensing result in the sensing region 105F is used, for example, for adaptive cruise control (ACC), emergency braking, collision avoidance, and the like.

Note that the sensing regions of the sensors of the camera 181, the radar 182, the LiDAR 183, and the ultrasonic sensor 184 included in the external recognition sensor 155 may have various configurations other than those in FIG. 5. Specifically, the ultrasonic sensor 184 may also sense the side of the vehicle 131, or the LiDAR 183 may sense the rear of the vehicle 131. Furthermore, an installation position of each sensor is not limited to each example described above.

Furthermore, the number of sensors may be one or plural. Furthermore, in the content distribution system 11 of FIG. 2, a configuration in which one vehicle 31 and one content server 32 are connected via a network (not illustrated) is illustrated, but a plurality of vehicles 31 and content servers 32 may be provided for the network (not illustrated).

<1-4. Configuration Example of Content Server>

Next, a configuration example of the content server 132 will be described with reference to FIG. 6.

The content server 132 includes a control unit 251, an input unit 252, an output unit 253, a storage unit 254, a communication unit 255, a drive 256, and a removable storage medium 257, and is connected to each other via a bus 258, and can transmit and receive data and programs.

The control unit 251 includes a processor and a memory, and controls the entire operation of the content server 132. Furthermore, the control unit 251 includes an information acquisition unit 261, a drive image distribution unit 262, and a content distribution unit 263.

When acquiring the drive image, the position information, and the information for identifying the vehicle 131 supplied from the vehicles 131-1 to 131-*n*, the information acquisition unit 261 stores the drive image, the position information, and the information for identifying the vehicle 131 in association with each other in the storage unit 254 as the drive image 273, and registers the corresponding information in the vehicle information DB 271. Note that the vehicle information DB 271 will be described later in detail with reference to FIG. 7.

When the distribution of the drive image is requested from the user terminal 133, the drive image distribution unit 262 accesses the vehicle information DB 271, reads information for identifying the vehicle 131 registered in association with the drive image, generates a vehicle list, controls the communication unit 255, and transmits the vehicle list to the user terminal 133.

When the information for specifying the vehicle 131 requested to distribute the drive image is supplied on the basis of the vehicle list in the user terminal 133, the drive image distribution unit 262 converts the drive image 273 managed on the basis of the vehicle information DB 271 into a display format displayable on the user terminal 133, and controls the communication unit 255 to distribute the drive image to the user terminal 133.

At this time, the drive image distribution unit 262 notifies the passenger of the vehicle 131 to which distribution of the drive image is requested of which user's user terminal 133 the distribution request is from, requests acceptance of the distribution, converts the drive image into a displayable display format only in a case where the acceptance is obtained, and controls the communication unit 255 to distribute the drive image to the user terminal 133.

When the generation of the content package is requested from the user terminal 133, the content distribution unit 263 reads the information on the reproduction condition and the material of the content registered in advance in the storage unit 272, generates the content material list, and controls the communication unit 255 to transmit the content material list to the user terminal 133 for which the generation of the content package is requested.

When the content package is generated and transmitted by editing the reproduction condition and the material of the content in the user terminal 133 on the basis of the information of the content material list, the content distribution unit 263 acquires and stores the content package and registers the content package in the interaction information DB 272. Furthermore, the content distribution unit 263 controls the communication unit 255 on the basis of the interaction information DB to transmit the content package to the target vehicle 131. Note that the interaction information DB 272 will be described later in detail with reference to FIG. 8.

The input unit 252 includes an input device such as a keyboard, a mouse, a touch panel, or a microphone to which a passenger of the vehicle 31 inputs an operation command or voice, and supplies various input signals to the control unit 251.

The output unit 253 is controlled by the control unit 251, and includes a display unit and an audio output unit. The output unit 53 outputs an operation screen or an image of a processing result to a display unit including a display device including a liquid crystal display (LCD), an organic electro luminescence (EL), or the like, and displays the operation screen or the image. Furthermore, the output unit 253 controls an audio output unit including an audio output device to output various sounds.

The storage unit 254 includes a hard disk drive (HDD), a solid state drive (SSD), a semiconductor memory, or the like, is controlled by the control unit 251, and writes or reads various data and programs including content data.

The communication unit 255 is controlled by the control unit 251, implements communication represented by a local area network (LAN), Bluetooth (registered trademark), or the like in a wired or wireless manner, and transmits and receives various data and programs to and from various devices via the network 134 as necessary.

The drive 256 reads and writes data from and to the removable storage medium 257 such as a magnetic disk (including a flexible disk), an optical disk (including a compact disc-read only memory (CD-ROM) and a digital versatile disc (DVD)), a magneto-optical disk (including a mini disc (MD)), or a semiconductor memory.

Furthermore, FIG. 3 illustrates an example in which the content server 132 is configured by a single computer or the like, but may be realized by cloud computing by a plurality of computers or a plurality of servers on a network.

<1-5. Configuration Example of Vehicle Information DB>

Next, a configuration example of the vehicle information DB 271 will be described with reference to FIG. 7.

The vehicle information DB 271 is a database of the vehicle 131 uploading the drive image.

More specifically, as illustrated in FIG. 7, the vehicle information DB 271 includes a vehicle ID, a starting point (latitude), a starting point (longitude), a current latitude, a current longitude, and a length (time).

The vehicle ID is an identifier for identifying each vehicle 131, and is expressed by, for example, an alphabet and a numerical value.

The starting point (latitude) and the starting point (longitude) are information on the latitude and longitude of the position to be the starting point of the vehicle 131 specified by the vehicle ID.

The current latitude and the current longitude are information on the latitude and longitude of the current position of the vehicle 131 specified by the vehicle ID. The length (time) is information indicating the recording time of the drive image.

More specifically, in FIG. 7, "35oi4hf9k", "lbo7fd83p", and "s89c6wp1" are displayed as the vehicle IDs from the top.

Then, the display indicates that the latitude of the position serving as the starting point of the vehicle 131 with the vehicle ID "35oi4hf9k" is "35.710089", the longitude information is "139.810711", the latitude of the current position is "35.710089", and the longitude is "139.810719".

Further, it is indicated that the length (time) of the drive image with the vehicle ID "35oi4hf9k" is 1 hour 58 minutes 37 seconds 96.

Further, the display indicates that the latitude of the position that is the starting point of the vehicle 131 with the vehicle ID "lbo7fd83p" is "35.****", the longitude information is "139.**", the latitude of the current position is "35.**", and the longitude is "139.****".

In addition, this example also indicates that the length (time) of the drive image with the vehicle ID "lbo7fd83p" is 4 minutes 52 seconds 48.

Further, the display indicates that the latitude of the position serving as the starting point of the vehicle 131 with the vehicle ID "s89c6wp1" is "35.****", the longitude information is "139.**", the latitude of the current position is "35.**", and the longitude is "139.****".

Further, it is indicated that the length (time) of the drive image of the vehicle 131 with the vehicle ID "s89c6wp1" is 36 minutes 45 seconds 22.

As described above, the vehicle information DB 271 is a database of the length (recording time) of the drive image in addition to the information of the starting point position and the current position for each vehicle 131.

<1-6. Configuration Example of Interaction DB>

Next, a configuration example of the interaction information DB 272 will be described with reference to FIG. 8.

The interaction information DB 272 is a database of content packages generated by the user terminal 133.

More specifically, as illustrated in FIG. 8, the interaction information DB 272 includes a content ID, a content name, an attribute, a material ID, a reproduction condition, and vehicle identification. That is, when the content package is generated, the content ID, the content name, the attribute, the material ID, the reproduction condition, and the vehicle identification are set. Among these, the content name, the reproduction condition, and the vehicle identification may be particularly set by the user.

The content ID is an identifier for identifying the content, and is expressed by, for example, an alphabet and a numerical value. The content name is information indicating the name of the content.

The attribute is information indicating the type of content, and is, for example, a sound effect, an image (including a moving image, a still image, a slide of a still image, an animation, and the like), a projection image projected on a window, a ceiling, or the like by using a projector or the like, an augmented reality (AR) image, performance by vibration, lighting performance (light performance) in which brightness or color emitted by a lighting fixture is changed in a predetermined rhythm, air blowing (including performance by changing an air volume and a wind direction), aroma generation (including aroma generation performance in which odor having different scents or a combination thereof is switched and output), a game (games such as quizzes, word chain, and singing) in which a user of another user terminal 133 or a passenger of the vehicle 131 can participate, or the like.

In FIG. 7, the attributes are, for example, "sound effect, light presentation, and animation". The content setting unit 221 in the vehicle 131 specifies a device in the content output unit 165 to be used for reproduction on the basis of the attribute information. The material ID is an identifier for identifying a material used to generate the content identified by the generated content ID, and is expressed by, for example, an alphabet and a numerical value.

The reproduction condition is a condition serving as a trigger for starting reproduction of the content specified by the content ID. For example, in a case where the vehicle 131 has intruded into a specific area according to the position information is a reproduction condition, the reproduction condition is "intruding". Furthermore, in a case where a predetermined object is imaged by the imaging device 41 is set as a reproduction condition, the reproduction condition is "imaging". Furthermore, in a case where a specific signal is detected by various sensors provided in the vehicle 131 is set as a reproduction condition, the reproduction condition is "detection". The vehicle identification is information for identifying the vehicle 131 as a target for reproducing the content. That is, the vehicle identification is information for distributing content generated by the user and identifying the vehicle 131 to be reproduced under a predetermined reproduction condition.

In addition, the reproduction condition may be a case where an oncoming vehicle with a specific vehicle number to be imaged is imaged, a case where a specific sign or a guide sign is imaged, a case where the passenger is imaged by the camera of the in-vehicle sensor 156, and a case where at least one of a specific expression, a specific line of sight, a specific body gesture, or a specific hand gesture, a combination thereof, or the like is detected in the drive image.

Furthermore, reproduction condition may be a case where the HMI 161 is operated and the capture operation is performed on the drive image captured by the camera 181 of the external recognition sensor 155 by the passenger of the vehicle 131 or the like.

More specifically, in the case of FIG. 8, the content IDs are indicated as "G35oi4hf9k", "Glb34o7fdp", and "Gs89c6wp1" from the top.

Then, the content with the content ID "G35oi4hf9k" has a content name of "level-up", an attribute of "sound effect", a material ID of "kd92kr50", a reproduction condition of "P1 (intrusion)", and a vehicle identification of "All", and indicates that all the vehicles 131 are distribution targets.

Further, the content with the content ID "Glb34o7fdp" has a content name of "mirror ball", an attribute of "light performance", a material ID of "3lic9r7ds", a reproduction condition of "C3 (imaging)", and a vehicle identification of "35oi4hf9k", and indicates that the vehicle 131 with the vehicle ID of "35oi4hf9k" is a distribution target.

Further, the content with the content ID "Gs89c6wp1" has a content name of "AR advertisement", an attribute of "animation", a material ID of "uygv23w", a reproduction condition of "S7 (sensing)", and a vehicle identification of "Model_L", and indicates that it is a vehicle 131 identified by "Model_L".

<1-7. Configuration Example of User Terminal>

Next, a configuration example of the user terminal 133 will be described with reference to FIG. 9.

The user terminal 133 includes a control unit 301, an input unit 302, an output unit 303, a storage unit 304, a communication unit 305, a drive 306, and a removable storage medium 307, and is connected to each other via a bus 308, and can transmit and receive data and programs.

Figure 6:
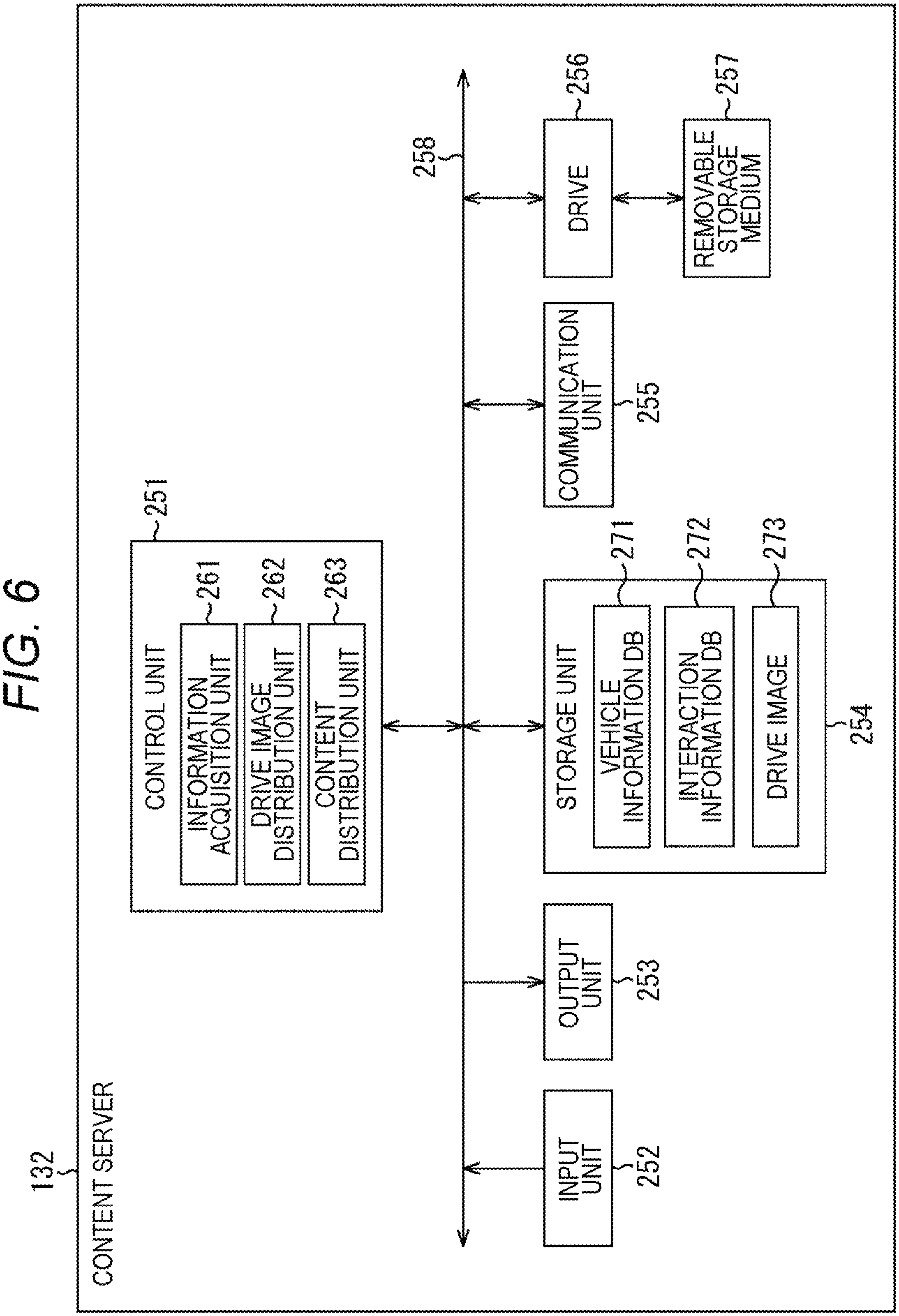
FIG. 6 is a block diagram illustrating a configuration example of a content server in FIG. 3.
Figure 9:
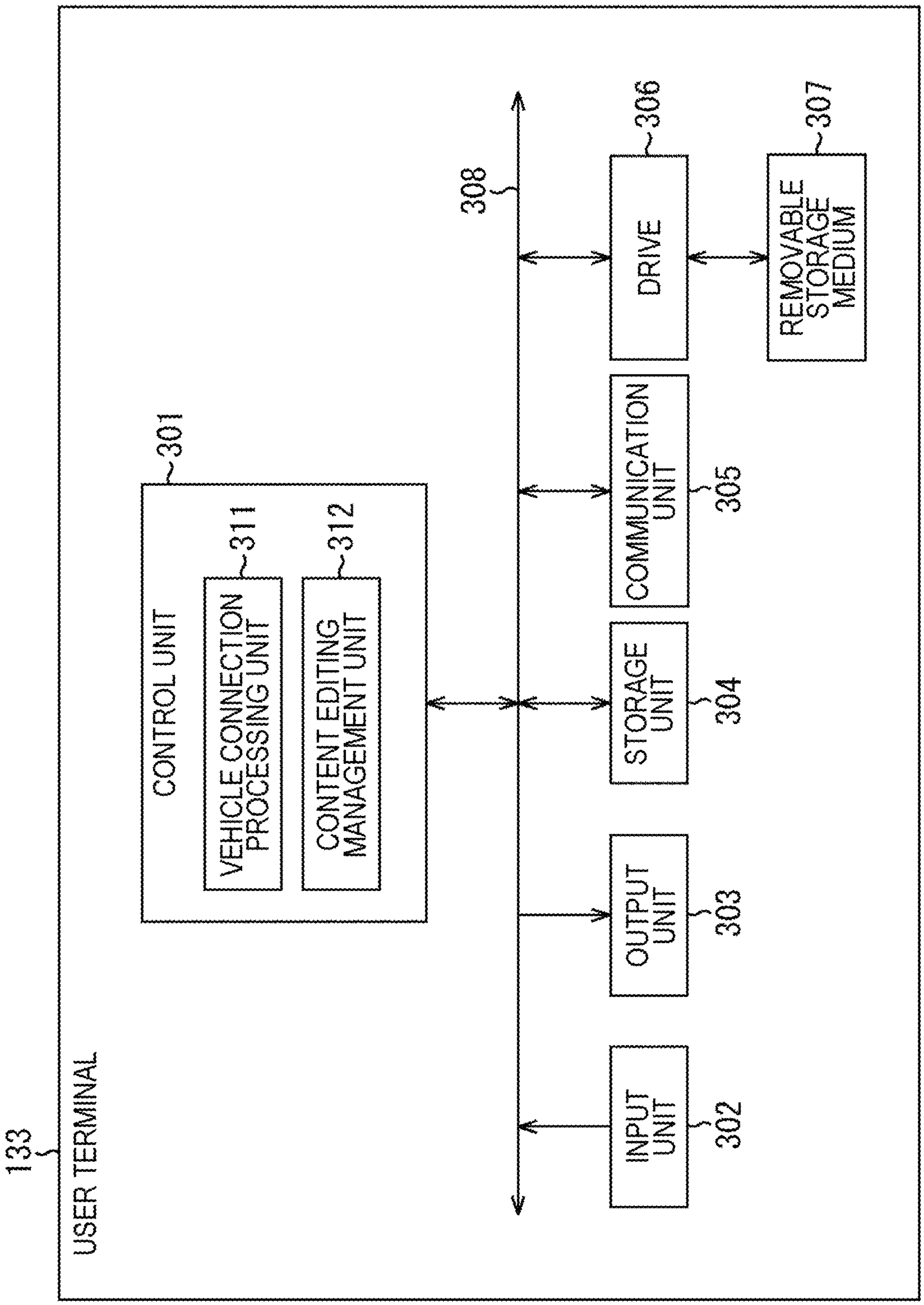
FIG. 9 is a block diagram illustrating a configuration example of a user terminal in FIG. 3.

Note that the control unit 301, the input unit 302, the output unit 303, the storage unit 304, the communication unit 305, the drive 306, the removable storage medium 307, and the bus 308 of the user terminal 133 in FIG. 9 have configurations corresponding to the control unit 251, the input unit 252, the output unit 253, the storage unit 254, the communication unit 255, the drive 256, the removable storage medium 257, and the bus 258 of the content server 132 in FIG. 6, respectively, and thus, description thereof is appropriately omitted as necessary.

The control unit 301 includes a processor and a memory, and controls the entire operation of the content server 32. In addition, the control unit 301 includes a vehicle connection processing unit 311 and a content editing management unit 312.

When the information requesting the distribution of the drive image is input by the user operating the input unit 302, the vehicle connection processing unit 311 controls the communication unit 305 to notify the content server 132 of the information.

When the vehicle list is transmitted from the content server 132 on the basis of this notification, the vehicle list is received by controlling the communication unit 305, is presented to the output unit 303, and is prompted to input information for specifying the vehicle 131 to which the drive image is desired to be distributed.

When the input unit 302 is operated by the user on the basis of this presentation and information for specifying the vehicle 131 to which the distribution of the drive image is desired is input, the vehicle connection processing unit 311 controls the communication unit 305 to transmit the input information for specifying the vehicle to the content server 132 and request the distribution of the drive image.

When the drive image of the specified vehicle 131 is transmitted from the content server 132 in response to this request, the vehicle connection processing unit 311 controls the communication unit 305 to acquire the transmitted drive image, stores the drive image in the storage unit 304, and presents the drive image by the output unit 303.

When the input unit 302 is operated by the user and generation of content to be reproduced under a predetermined reproduction condition is requested, the content editing management unit 312 controls the communication unit 305 to transmit information requesting generation of a content package to the content server 132.

When the content material list is transmitted from the content server 132 in response to the request, the content editing management unit 312 acquires the transmitted content material list, and controls the output unit 303 to edit the material of the content on the basis of the content material list, and presents information prompting generation of a new content package.

When the input unit 302 is operated by the user on the basis of the presentation, the material of the content is edited, and the reproduction condition of the content is input, the content editing management unit 312 controls the communication unit 305 to transmit a content package including information indicating the reproduction condition of the content in the edited content to the content server 132. More specifically, the content editing management unit 312 generates a content package including each piece of information of the content name, the attribute, the material ID, the reproduction condition, and the vehicle identification in the interaction information DB of FIG. 8 input by the user operating the input unit 302.

<1-8. Drive Image Sharing Processing>

Figure 10:
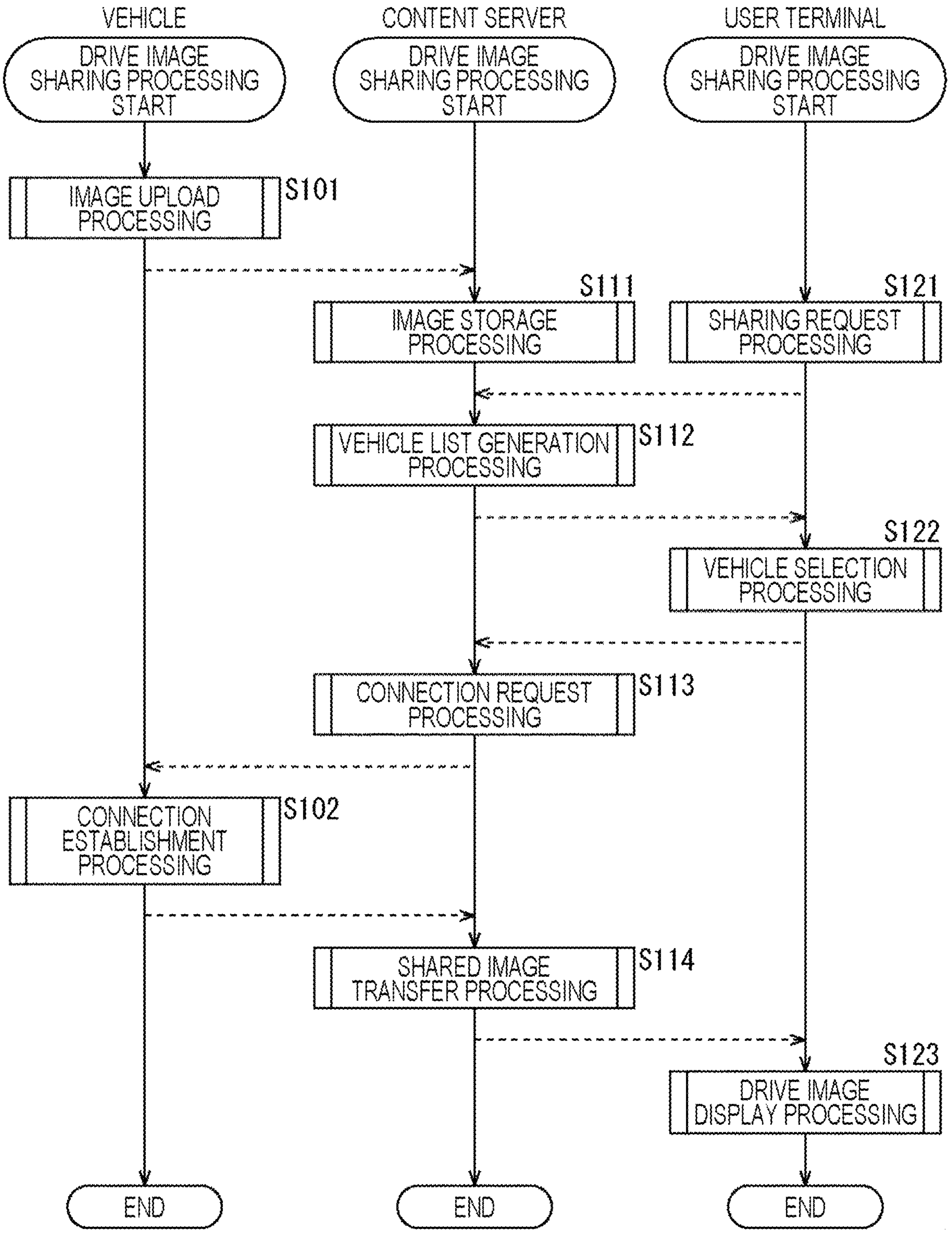
FIG. 10 is a flowchart for explaining drive image sharing processing by the content distribution system in FIG. 3.

Next, drive image sharing processing will be described with reference to a flowchart of FIG. 10.

In step S101, the vehicle 131 executes image upload processing, captures a drive image, and uploads the drive image to the content server 132.

Figure 11:
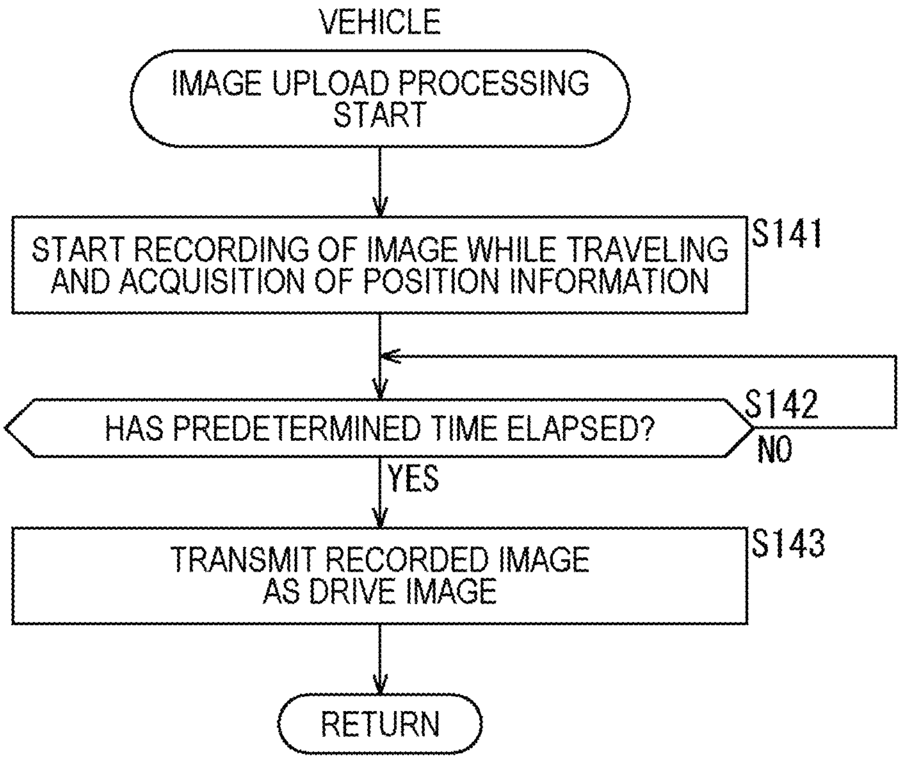
FIG. 11 is a flowchart for explaining image upload processing by the vehicle of the flowchart of FIG. 10.

Note that the image upload processing will be described later in detail with reference to the flowchart of FIG. 11.

In step S111, the content server 132 executes image storage processing and stores the drive image uploaded from the vehicle 131.

Figure 12:
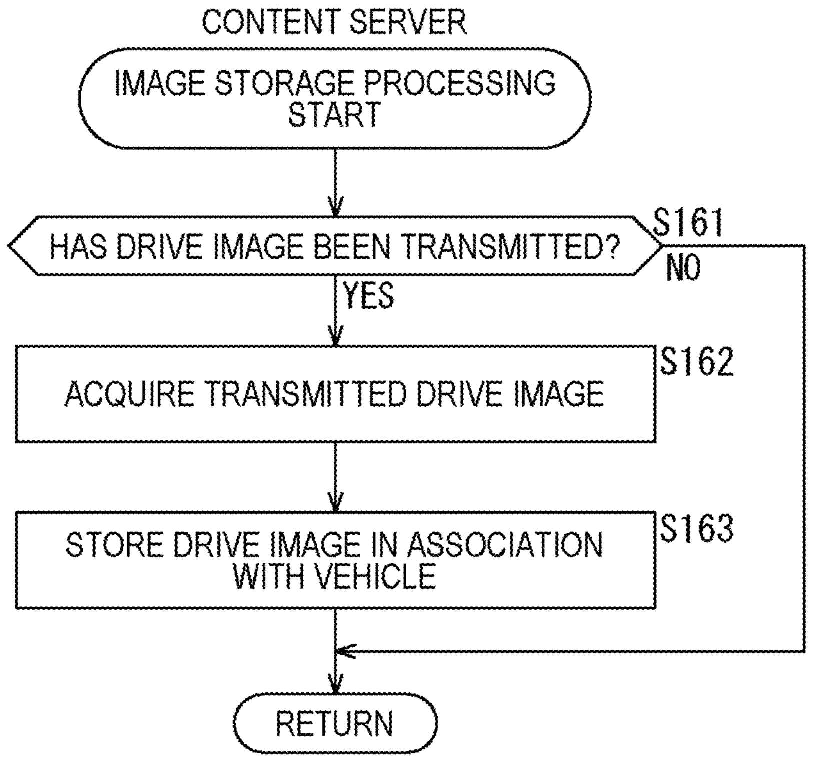
FIG. 12 is a flowchart for explaining image storage processing by the content server in the flowchart of FIG. 10.

Note that the image storage processing will be described later in detail with reference to the flowchart of FIG. 12.

In step S121, the user terminal 133 executes sharing request processing by the user's operation to request sharing of the drive image.

Figure 13:
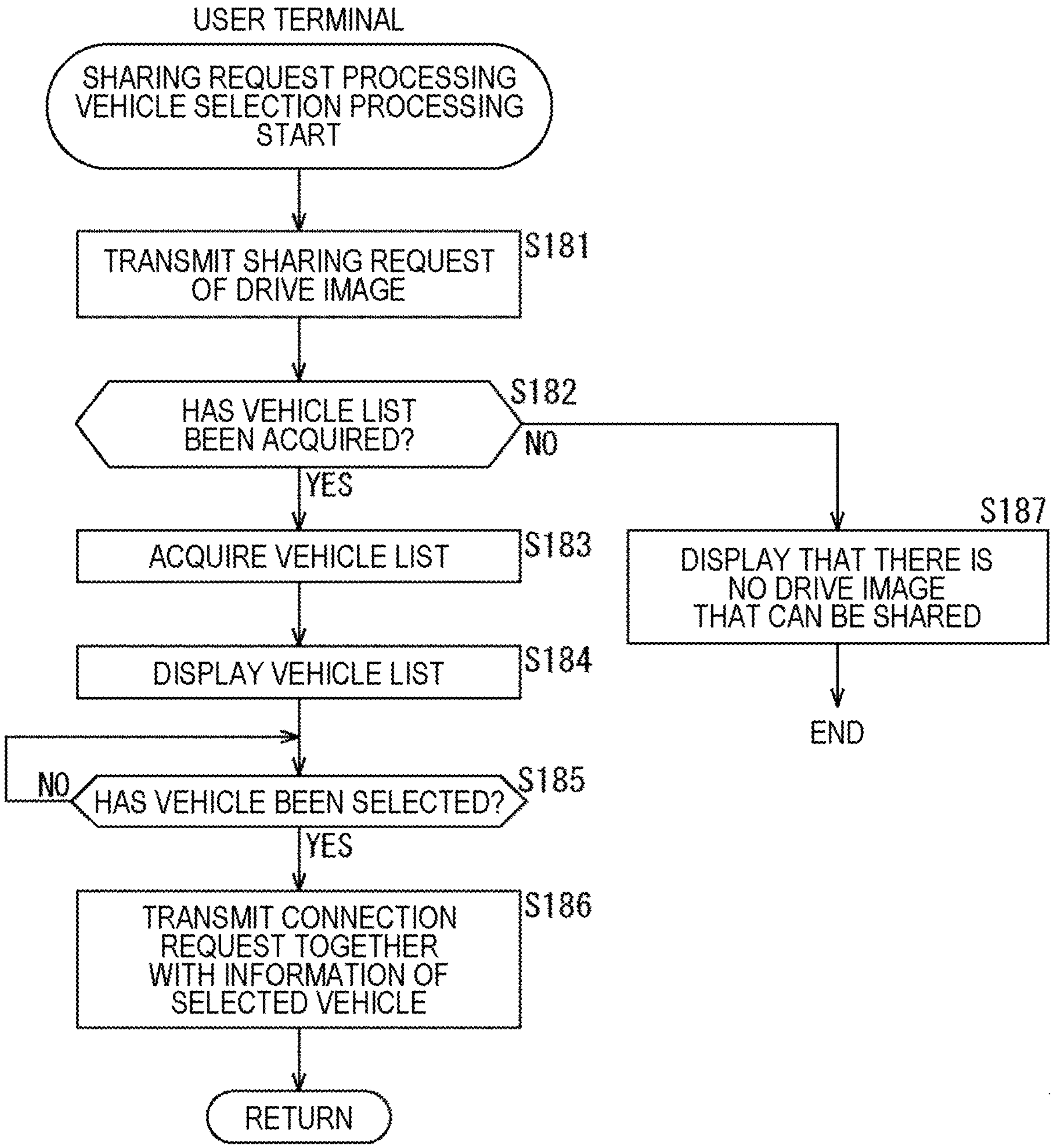
FIG. 13 is a flowchart for explaining sharing request processing and image selection processing by the user terminal of the flowchart of FIG. 10.

Note that details of the sharing request processing will be described later with reference to the flowchart of FIG. 13.

In response to the drive image sharing request from the user terminal 133, in step S112, the content server 132 executes vehicle list generation processing, generates a vehicle list including information for identifying the vehicle 131 in which the drive image is stored, and transmits the vehicle list to the user terminal 133.

Figure 14:
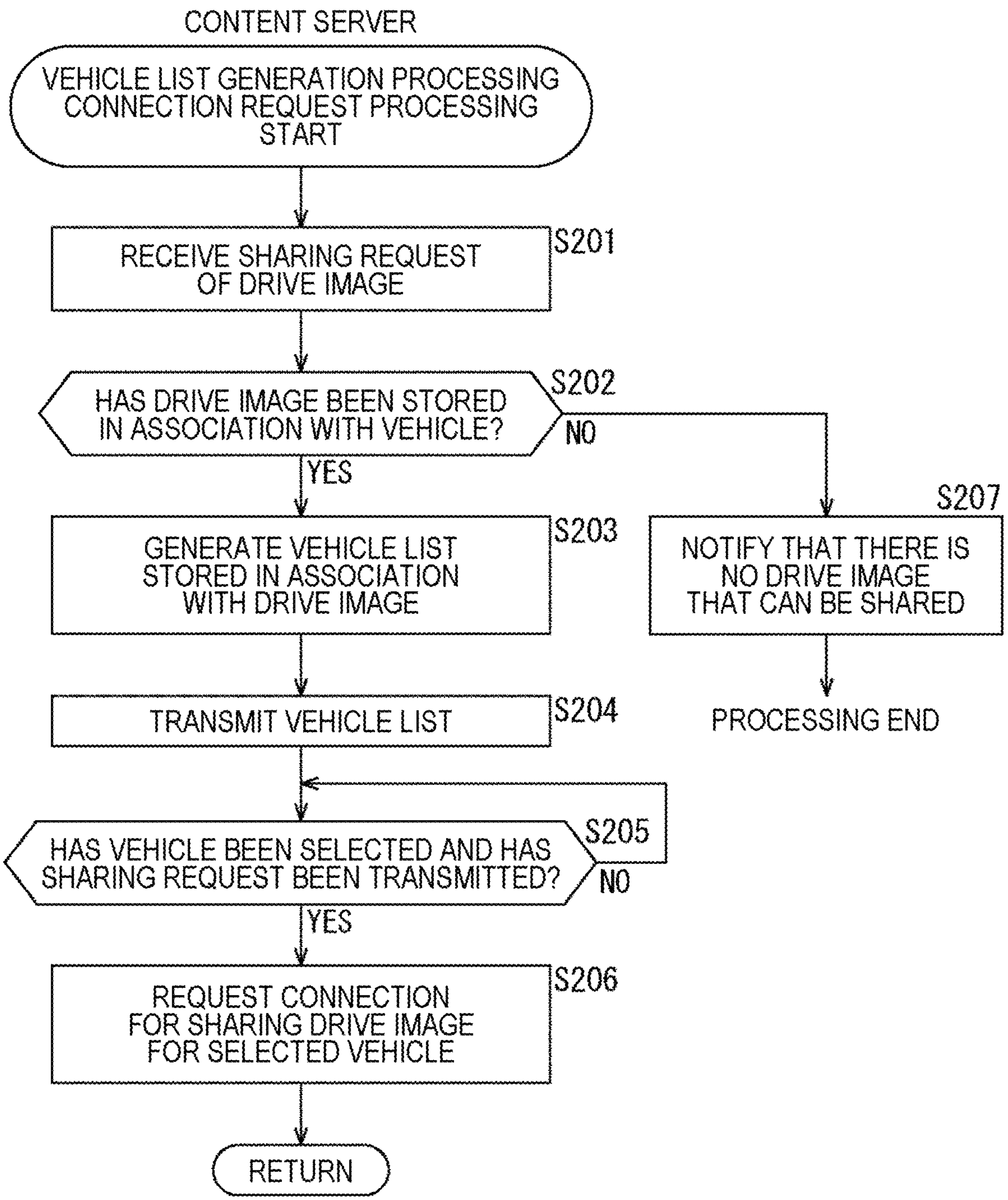
FIG. 14 is a flowchart for explaining vehicle list generation processing and connection request processing by the content server of the flowchart of FIG. 10.

Note that the vehicle list generation processing will be described later in detail with reference to the flowchart of FIG. 14.

In step S122, the user terminal 133 executes vehicle selection processing, acquires a vehicle list supplied from the content server 132, and presents an image prompting selection of the vehicle 131 sharing the drive image. Then, the user terminal 133 transmits information for specifying the vehicle 131 selected by the user to the content server 132.

Note that the vehicle selection processing will be described later in detail with reference to the flowchart of FIG. 13.

In step S113, the content server 132 executes connection request processing, and inquires of the vehicle 131 that desires to share the drive image supplied from the user terminal 133 about approval of sharing of the drive image.

Note that the connection request processing will be described later in detail with reference to the flowchart of FIG. 14.

In step S102, the vehicle 131 executes connection establishment processing, presents an image inquiring whether or not to approve to the passenger of the vehicle 131 on the basis of an inquiry about approval of sharing of the drive image from the content server 132, and transmits connectability information corresponding to presence or absence of approval of sharing of the drive image from the passenger to the content server 132.

Here, when approving the sharing of the drive image, the vehicle 131 presents information of the user who has accepted the sharing to the passenger.

Figure 15:
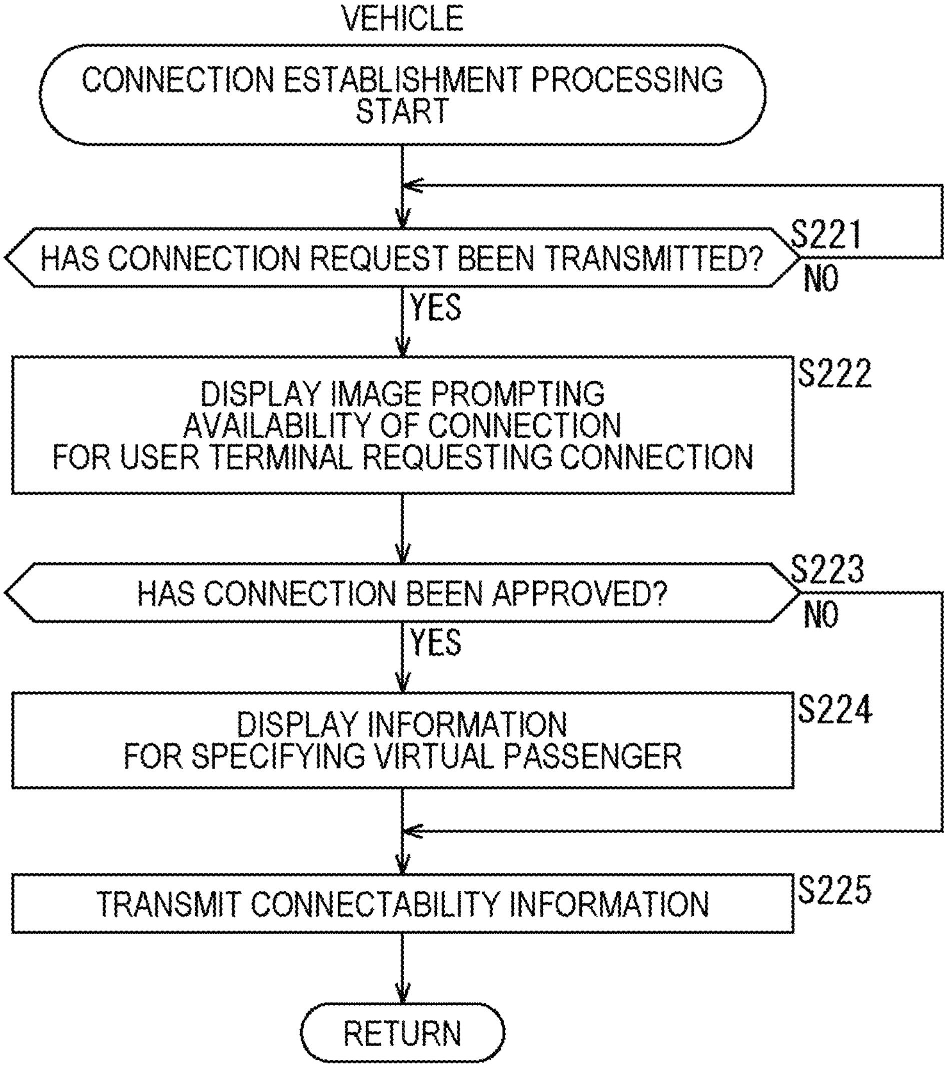
FIG. 15 is a flowchart for explaining connection establishment processing by the vehicle in the flowchart of FIG. 10.

Note that details of the connection establishment processing will be described later with reference to the flowchart of FIG. 15.

In step S114, the content server 132 executes shared image transfer processing, and transfers the stored drive image to the user terminal 133 and starts sharing distribution of the drive image when sharing of the drive image is approved on the basis of the connectability information from the vehicle 131. At this time, the content server 132 realizes mutual communication between the vehicle 131 and the user terminal 133, and sets a state in which mutual communication is possible by, for example, voice chat or the like.

Figure 16:
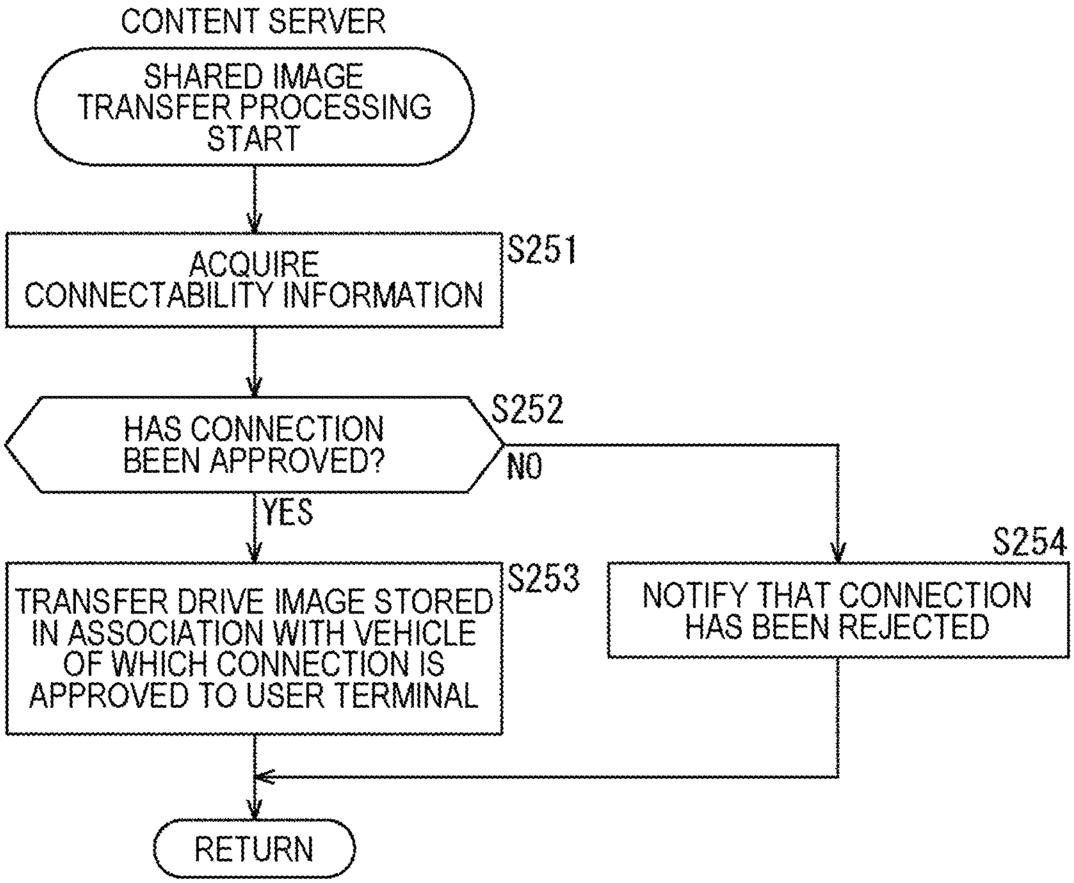
FIG. 16 is a flowchart for explaining shared image transfer processing by the content server of the flowchart of FIG. 10.

Note that details of the shared image transfer processing will be described later with reference to the flowchart of FIG. 16.

In step S123, the user terminal 133 executes drive image display processing, acquires a drive image supplied from the content server 132, and presents the drive image to the user.

Figure 17:
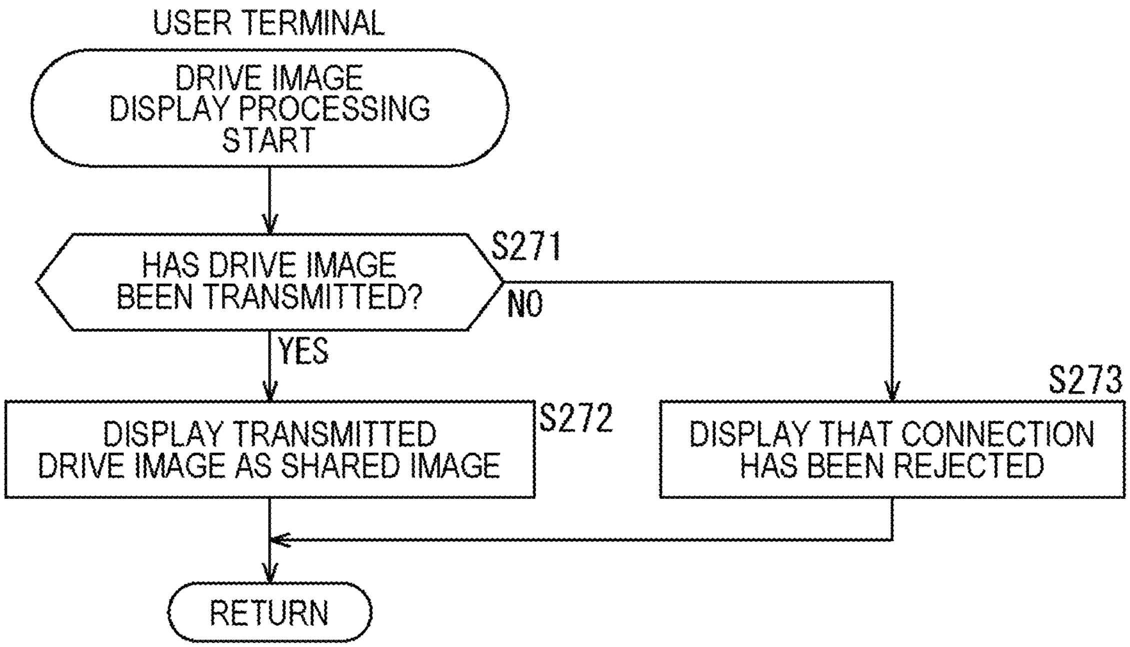
FIG. 17 is a flowchart for explaining drive image display processing by the user terminal of the flowchart of FIG. 10.

Note that details of the drive image display processing will be described later with reference to the flowchart of FIG. 17.

Through the above series of processing, the drive image captured by the vehicle 131 is stored in the content server 132. In addition, when the content server 132 is requested to share the drive image by the user terminal 133 operated by the user who is the virtual passenger, a vehicle list that is a list of the vehicles 131 to which the drive image has been uploaded is generated and supplied to the user terminal 133. When the vehicle with which the drive image is desired to be shared is specified on the basis of the vehicle list, the content server 132 requests permission of sharing the drive image from the vehicle 131, and when the sharing of the drive image is permitted by the passenger of the vehicle 131, the stored drive image is distributed to the user terminal 133.

As a result, it is possible to provide a virtual drive environment as if a passenger of the vehicle 131 and a user who operates the user terminal 133 ride together.

<1-9. Image Upload Processing>

Next, image upload processing by the vehicle 131 will be described with reference to a flowchart of FIG. 11.

In step S141, the drive recorder control unit 163 of the vehicle 131 starts recording, in the storage unit 158, the image captured by the camera 181 of the external recognition sensor 155 and the latitude and longitude information that is its own position information acquired by the position information acquisition unit 154. Note that, at this time, the drive recorder control unit 163 may record, in the storage unit 158, sound collected by the microphone of the in-vehicle sensor 156 together with a recorded image of the state of the inside of the vehicle captured by the camera of the in-vehicle sensor 156 and a recorded image captured by another camera.

In step S142, the drive recorder control unit 163 determines whether or not a predetermined time has elapsed, and repeats similar processing until the predetermined time has elapsed. Then, in a case where it is determined in step S142 that the predetermined time has elapsed, the processing proceeds to step S143. Note that the predetermined time here is a minimum unit of the recording time of the drive image, or the like.

In step S143, the drive recorder control unit 163 reads the image stored in the storage unit 158 and the time-series position information, and controls the communication unit 152 to transmit the image and the information for identifying the vehicle 131 to the content server 132 as a drive image.

Note that this processing is repeated until the vehicle 131 arrives at the destination from the starting point position.

By the above processing, the drive image and the position information are continuously supplied to the content server 132 together with the information for identifying the vehicle 131 at every predetermined time until the vehicle 131 moves to the destination. Note that the drive image and the collected sound may be treated as integrated data.

<1-10. Image Storage Processing>

Next, image storage processing by the content server 132 will be described with reference to a flowchart of FIG. 12.

In step S161, the information acquisition unit 261 of the content server 132 controls the communication unit 255 to determine whether or not a drive image has been transmitted from the vehicle 131.

In a case where it is determined in step S161 that a drive image has been transmitted, the processing proceeds to step S162.

In step S162, the information acquisition unit 261 controls the communication unit 255 to acquire position information and information for identifying the vehicle 131 included in the drive image together with the transmitted drive image.

In step S163, the information acquisition unit 261 stores the supplied data of the drive image as the drive image 273 in the storage unit 254 in association with the information for identifying the vehicle 131. At this time, the information acquisition unit 261 updates the information of the current latitude and the current longitude of the vehicle information DB 271 and the length (time) of the drive image. Note that the information acquisition unit 261 registers the starting point (latitude) and the starting point (longitude) on the basis of the first position information at which the transmission of the drive image is started.

Note that, in a case where the drive image is not transmitted in step S161, the processes in steps S162 and S163 are skipped.

Furthermore, the above similar processing is repeated until the processing by the content server 132 is completed.

With the above processing, when the drive image is transmitted from each of the vehicles 131, the drive image is stored as the drive image 273 in association with the information for identifying the vehicle 131, and the vehicle information DB 271 is sequentially updated.

<1-11. Sharing Request Processing, Vehicle List Generation Processing, Vehicle Selection Processing, and Connection Request Processing>

Next, sharing request processing and vehicle selection processing by the user terminal 133 will be described with reference to a flowchart of FIG. 13. In addition, vehicle list generation processing and connection request processing by the content server 132 will be described with reference to a flowchart of FIG. 14.

In step S181 (FIG. 13), when the sharing of the drive image is requested by the user operating the input unit 302 or the like, the vehicle connection processing unit 311 of the user terminal 133 controls the communication unit 305 to transmit the sharing request of the drive image together with the information for identifying the user terminal 133 to the content server 132.

In step S201 (FIG. 14), the drive image distribution unit 262 of the content server 132 controls the communication unit 255 to receive a drive image sharing request from the user terminal 133.

In step S202, the drive image distribution unit 262 accesses the vehicle information DB 271 of the storage unit 254, and determines whether or not the drive image 273 is stored in association with the information (vehicle ID) for identifying the vehicle 131.

In a case where the drive image is stored in step S202, the processing proceeds to step S203.

In step S203, the drive image distribution unit 262 reads information (vehicle ID) for identifying the vehicle 131 registered in association with the drive image, and generates a vehicle list including the vehicles 131 capable of distributing the drive image. At this time, the vehicle list may include information on the current position of each vehicle 131.

In step S204, the drive image distribution unit 262 controls the communication unit 255 to transmit the generated vehicle list to the user terminal 133 that has transmitted the drive image sharing request.

In addition, in a case where it is determined in step S202 that the drive image is not stored, the processing proceeds to step S207.

In step S207, the drive image distribution unit 262 controls the communication unit 255 to transmit information indicating that there is no drive image that can be shared to the user terminal 133, and the process ends.

Meanwhile, in step S182 (FIG. 13), the vehicle connection processing unit 311 of the user terminal 133 controls the communication unit 305 to determine whether or not the vehicle list has been transmitted from the content server 132.

In a case where it is determined in step S182 that the vehicle list has been transmitted, the processing proceeds to step S183.

In step S183, the drive image distribution unit 262 controls the communication unit 305 to acquire the vehicle list transmitted from the content server 132.

In step S184, the drive image distribution unit 262 controls the display or the like of the output unit 253 to display a vehicle list to which the acquired drive image can be distributed and to display an image prompting selection of a vehicle with which the drive image is desired to be shared. At this time, in a case where the position information of each vehicle 131 is included, the drive image distribution unit 262 also presents the position information. As a result, the user can select the vehicle 131 desired by the user on the basis of the position information.

In step S185, the drive image distribution unit 262 determines whether or not the vehicle 131 with which the drive image is desired to be shared is selected by operating the input unit 302 or the like, and repeats similar processing until the vehicle is selected.

Then, in a case where it is determined in step S185 that the vehicle 131 with which the drive image is desired to be shared is selected, the processing proceeds to step S186.

In step S186, the drive image distribution unit 262 controls the communication unit 255 to transmit a connection request for sharing the drive image to the content server 132 together with the selected information for specifying the vehicle 131 requested to share the drive image.

Meanwhile, in a case where the vehicle list is not acquired in step S182, that is, here, information indicating that there is no distributable drive image is acquired, and thus the processing proceeds to step S187.

In step S187, the drive image distribution unit 262 controls the display or the like of the output unit 253 to present information indicating that there is no drive image that can be shared, and ends the processing.

In step S205 (FIG. 14), the drive image distribution unit 262 of the content server 132 controls the communication unit 255 to receive the connection request for sharing the drive image together with the information for identifying the vehicle 131 with which the drive image is desired to be shared from the user terminal 133.

In step S206, the drive image distribution unit 262 transmits information requesting connection for sharing the drive image to the vehicle 131 corresponding to the acquired information for identifying the vehicle 131. At this time, the drive image distribution unit 262 transmits information (including information for identifying the user) for identifying the user terminal 133 requesting the sharing of the drive image to the vehicle 131.

According to the above processing, when sharing of the drive image is requested from the user terminal 133, a vehicle list capable of sharing the drive image is supplied, and when the vehicle 131 for which sharing of the drive image is desired is selected from the vehicle list, a connection request for sharing the drive image is made from the content server 132 to the selected vehicle 131.

<1-12. Connection Establishment Processing>

Next, connection establishment processing by the vehicle 131 will be described with reference to a flowchart of FIG. 15.

In step S221, the drive recorder control unit 163 of the vehicle 131 controls the communication unit 152 to determine whether or not a connection request for sharing a drive image has been transmitted, and repeats similar processing until the connection request is transmitted.

In a case where it is determined in step S221 that a connection request for sharing a drive image has been transmitted, the processing proceeds to step S222.

In step S222, the drive recorder control unit 163 controls the display unit such as the HMI 161 to present information (including information for identifying the user) for identifying the user terminal 133 requesting connection, and displays an image prompting availability of connection for sharing the drive image.

In step S223, the drive recorder control unit 163 controls the HMI 161 to determine whether or not the connection for sharing the drive image is approved by the operation by the passenger.

In a case where the connection for sharing the drive image is approved in step S223, the processing proceeds to step S224.

In step S224, the drive recorder control unit 163 controls the HMI 161 to present information for identifying the user terminal 133 sharing the drive image (including information for identifying the user) as information indicating that the user is recognized as a virtual passenger.

In step S225, the drive recorder control unit 163 controls the communication unit 152 to transmit the connectability information according to the connection approval result for sharing the drive image to the content server 132. That is, in a case where the connection is approved, information indicating that the connection for sharing the drive image is approved is transmitted to the content server 132 as the connectability information.

Meanwhile, in a case where the connection is not approved in step S223, the processing in step S224 is skipped, and in step S225, information indicating that the connection for sharing the drive image is rejected is transmitted to the content server 132 as the connectability information.

By the above processing, when connection for sharing the drive image is requested, the passenger determines whether or not the connection is possible, and the connectability information corresponding to the result of the connectability determination is transmitted to the content server 132.

<1-13. Shared Image Transfer Processing>

Next, shared image transfer processing by the content server 132 will be described with reference to a flowchart of FIG. 16.

In step S251, the drive image distribution unit 262 controls the communication unit 255 to acquire the connectability information transmitted from the vehicle 131.

In step S252, the drive image distribution unit 262 determines whether or not the acquired connectability information is information for approving connection.

In a case where it is determined in step S252 that the connectability information is information for approving connection, the processing proceeds to step S253.

In step S253, the drive image distribution unit 262 accesses the storage unit 254, reads the drive image 273 stored in association with the vehicle 131 of which connection is approved, converts the drive image into a displayable display format in the user terminal 133 requesting sharing of the drive image, and transfers the drive image.

At this time, the drive image distribution unit 262 establishes communication between the vehicle 131 and the user terminal 133, and enables mutual voice chat, for example. That is, here, the sound in the vehicle 131 collected by (the microphone of) the in-vehicle sensor 156 of the vehicle 131 and the sound collected by the microphone included in the input unit 302 of the user terminal 133 can be exchanged between the vehicle 131 and the user terminal 133 by mutual communication, the sound collected in the user terminal 133 is output from the speaker of the HMI 161 of the vehicle 131, and the sound collected in the vehicle 131 is output from the speaker of the output unit 303.

Meanwhile, in a case where it is determined in step S252 that the connectability information is information for rejecting connection, the processing proceeds to step S254.

In step S254, the drive image distribution unit 262 controls the communication unit 255 to transmit information indicating that the connection is rejected to the user terminal 133 requesting the sharing of the drive image.

By the above processing, when the connection is approved on the basis of the connectability information from the vehicle 131, the drive image registered in association with the vehicle 131 for which the connection is approved is transmitted to the user terminal 133 requesting sharing of the drive image, and communication between the vehicle 131 and the user terminal 133 is established, so that a state in which mutual conversation such as voice chat is possible is set.

<1-14. Drive Image Display Processing>

Next, drive image display processing by the user terminal 133 will be described with reference to a flowchart of FIG. 17.

In step S271, the vehicle connection processing unit 311 controls the communication unit 305 to determine whether or not a drive image has been transmitted from the content server 132.

In a case where it is determined in step S271 that a drive image has been transmitted, the processing proceeds to step S272.

In step S272, the vehicle connection processing unit 311 controls the communication unit 305 to acquire the transmitted drive image, and displays the drive image as a shared image on a display or the like of the output unit 303. At this time, the vehicle connection processing unit 311 establishes a connection with the vehicle 131 via the content server 132, and enables mutual conversation by voice chat or the like.

Meanwhile, in a case where it is determined in step S271 that no drive image has been transmitted, that is, a notification indicating that the connection has been rejected has been transmitted, the processing proceeds to step S273.

In step S273, the vehicle connection processing unit 311 controls the communication unit 305 to acquire the transmitted notification indicating that the connection is rejected, and presents information notifying that the connection is rejected on the display or the like of the output unit 303.

As a result of the above processing, in a case where the sharing of the drive image is approved by the passenger of the vehicle 131, the drive image is transmitted to the user terminal 133 and displayed as the shared image, and mutual communication is established to realize mutual conversation by voice chat or the like. Furthermore, in a case where the sharing of the drive image is rejected by the passenger of the vehicle 131, information indicating that the connection is rejected is acquired, and information indicating that the connection is rejected is presented.

As described above, the drive image of the vehicle 131 is shared with the user terminal 133 by the various processes described with reference to the flowcharts of FIGS. 11 to 17, and mutual communication is established. As a result, a virtual drive environment can be provided between the passenger of the vehicle 131 and the user of the user terminal 133.

<1-15. Interaction Processing>

Figure 18:
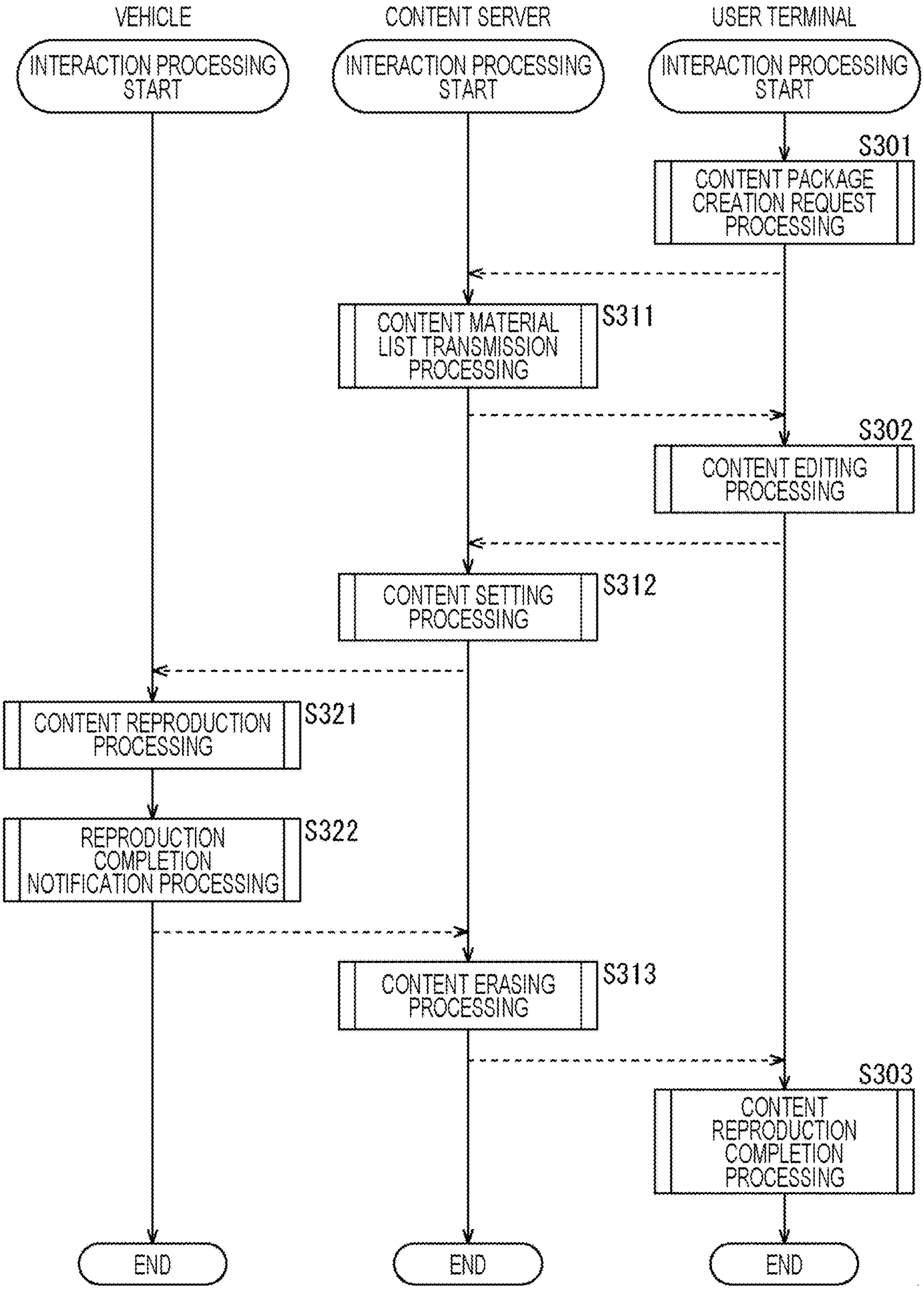
FIG. 18 is a flowchart for explaining interaction processing by the content distribution system in FIG. 3.

Next, interaction processing by the content distribution system 111 will be described with reference to a flowchart in FIG. 18.

In step S301, when a content package creation request for realizing the interaction processing is input by the user operating the input unit 302 or the like, the content editing management unit 312 of the user terminal 133 executes the content package creation request processing, and controls the communication unit 305 to transmit the content creation request to the content server 132.

Figure 19:
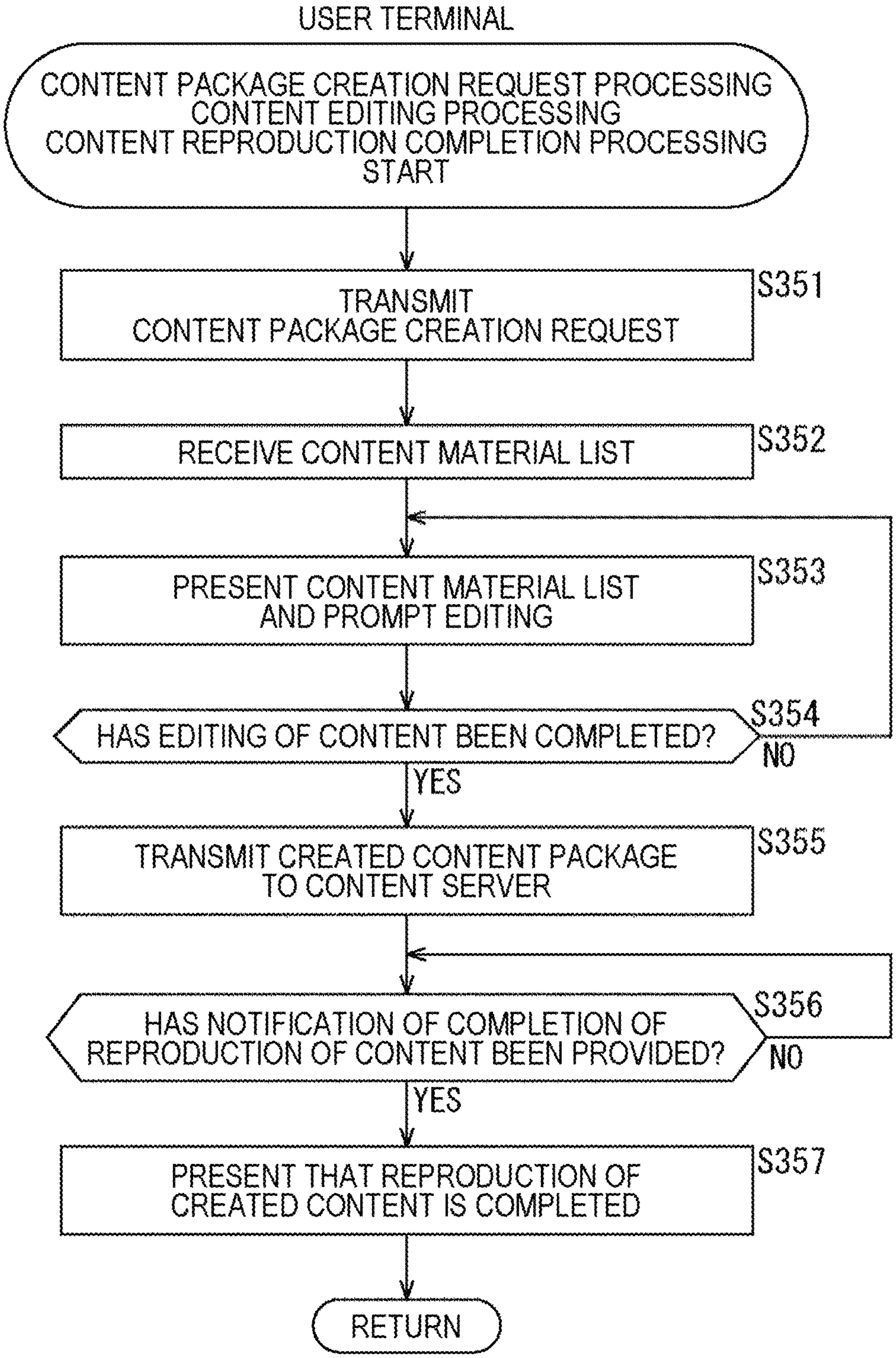
FIG. 19 is a flowchart for explaining content creation request processing, content editing processing, and content reproduction completion processing by the user terminal of the flowchart of FIG. 18.

Note that the content package creation request processing will be described later in detail with reference to the flowchart of FIG. 19.

In step S311, the content distribution unit 263 of the content server 132 controls the communication unit 255 to execute content material list transmission processing when a content package creation request is transmitted from the user terminal 133, generate a content material list, which is a list of materials necessary for creating the content package, and transmit the content material list to the user terminal 133.

Figure 20:
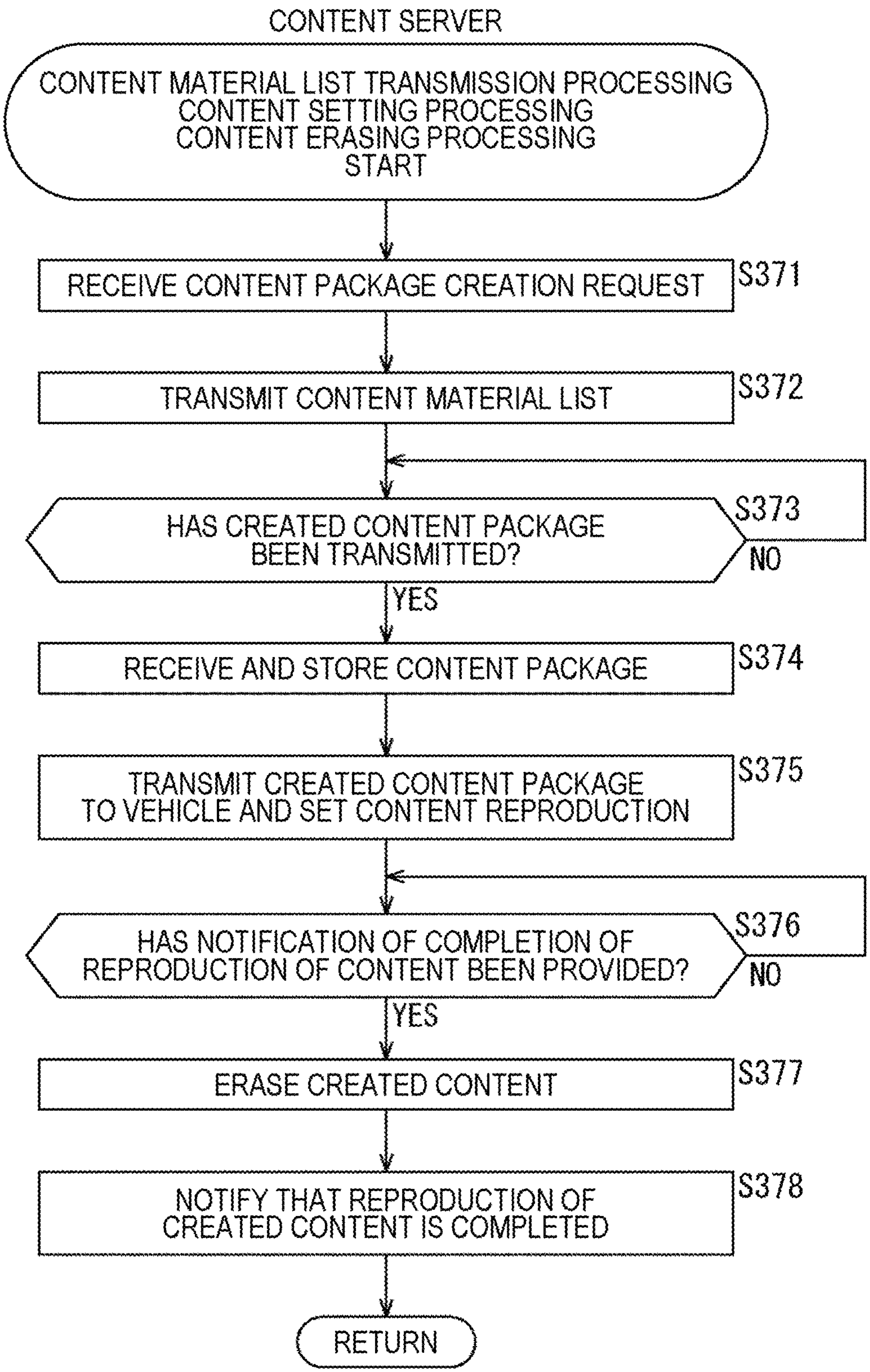
FIG. 20 is a flowchart for explaining content material list transmission processing, content setting processing, and content erasing processing by the content server in the flowchart of FIG. 18.

Note that details of the content material list transmission processing will be described later with reference to the flowchart of FIG. 20.

In step S302, when acquiring the transmitted content material list by controlling the communication unit 305, the content editing management unit 312 of the user terminal 133 executes the content editing processing, presents the content material list to the user, and presents an image prompting editing of the content using the material necessary for generating the content package on the basis of the content material list. When the content is edited by the user and the reproduction condition is set, the content editing management unit 312 transmits the edited content and the reproduction condition to the content server 132 as a content package.

Note that the content editing processing will be described later in detail with reference to the flowchart of FIG. 19.

In step S312, when the content package generated by the user terminal 133 is transmitted, the content distribution unit 263 of the content server 132 controls the communication unit 255 and acquires the content package, stores the reproduction condition and the content, and registers the content information in the interaction information DB 272. Then, the content server 132 transmits the acquired content to the target vehicle 131 together with the reproduction condition so that the content can be reproduced.

Note that the content setting processing will be described later in detail with reference to the flowchart of FIG. 20.

In step S321, when the content is transmitted from the content server 132, the content reproduction management unit 164 of the vehicle 131 executes the content reproduction processing, controls the communication unit 152 to acquire the transmitted content, performs reproduction setting based on the reproduction condition, and controls the content output unit 165 to output and reproduce the content.

Figure 21:
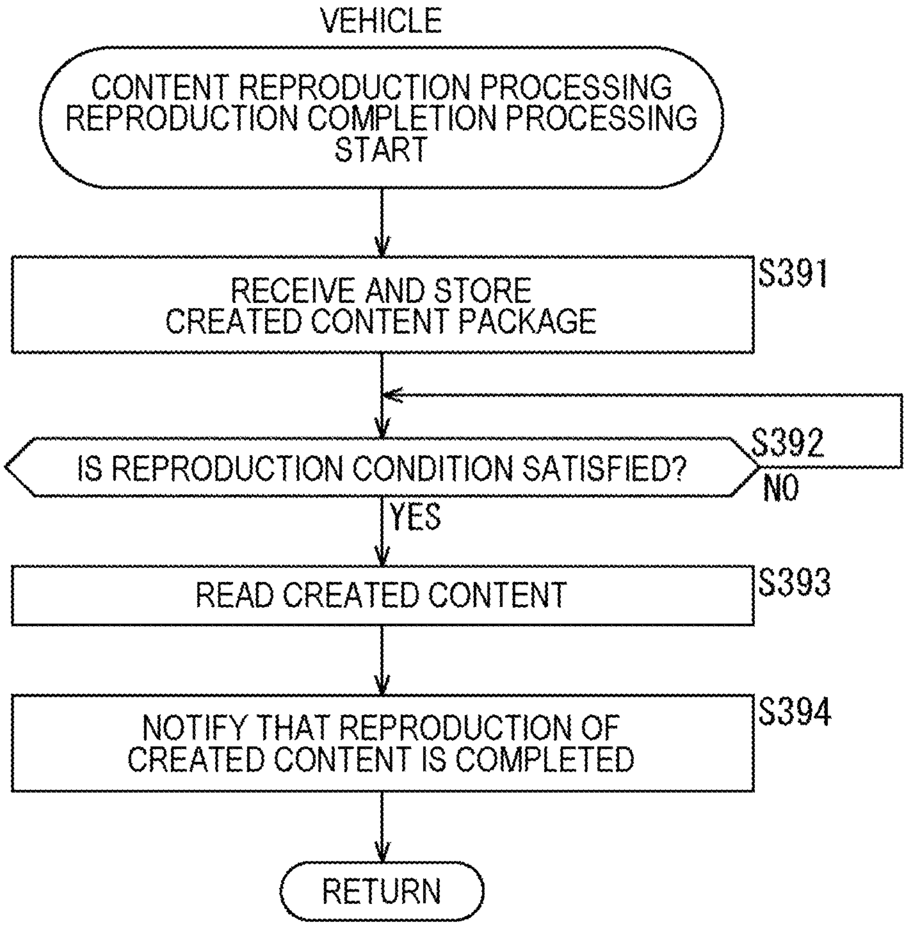
FIG. 21 is a flowchart for explaining content reproduction processing and reproduction completion processing by the vehicle in the flowchart of FIG. 18.

Note that the content reproduction processing will be described later in detail with reference to the flowchart of FIG. 21.

In step S322, when the reproduction of the content is completed, the content reproduction management unit 164 executes reproduction completion notification processing, and controls the communication unit 152 to notify the content server 132 that the reproduction of the content is completed.

Note that the reproduction completion notification processing will be described later in detail with reference to the flowchart of FIG. 21.

In step S313, the content distribution unit 263 of the content server 132 controls the communication unit 255 to execute the content erasing processing when the notification indicating the completion of the reproduction of the content is acquired from the vehicle 131, erases the content supplied from the user terminal 133, updates the interaction information DB 272, and notifies the user terminal 133 that the reproduction of the content has been completed.

Note that the content erasing processing will be described later in detail with reference to the flowchart of FIG. 20.

In step S303, the content editing management unit 312 of the user terminal 133 controls the communication unit 305, and when a notification indicating the completion of the reproduction of the content is transmitted from the content server 132, the content editing management unit 312 executes the content reproduction completion processing and presents the completion of the reproduction of the content to the user.

Note that the content reproduction completion processing will be described later in detail with reference to the flowchart of FIG. 19.

Through the series of processing described above, the user who operates the user terminal 133 can generate a content package including content to be reproduced, a reproduction condition, and the like under a desired reproduction condition with respect to the vehicle 131 sharing the drive image, transmit the content package via the content server 132, and set the reproduction of the content, and when the reproduction condition is satisfied, the content edited by the user of the user terminal 133 is reproduced.

As a result, it is possible to transmit the content to be presented together with the reproduction condition from the user of the user terminal 133 who is provided with the virtual drive environment by sharing the drive image to the passenger of the vehicle 131, set the reproduction of the content, and reproduce the content when the reproduction condition is satisfied.

As a result, it is possible to realize interaction by reproduction of content between the passenger of the vehicle 131 provided with the virtual drive environment and the user (virtual passenger) of the user terminal 133.

<1-16. Details of Interaction Processing>

Next, details of the interaction processing will be described with reference to flowcharts of FIGS. 19 to 21.

Here, the content package creation request processing, the content editing processing, and the content reproduction completion processing by the user terminal 133 will be described with reference to the flowchart in FIG. 19, the content material list transmission processing, the content setting processing, and the content erasing processing by the content server 132 will be described with reference to the flowchart in FIG. 20, and the content reproduction processing and the reproduction completion notification processing by the vehicle 131 will be described with reference to the flowchart in FIG. 21.

In step S351 (FIG. 19), when a content package creation request for realizing the interaction processing is input by the user operating the input unit 302 or the like, the content editing management unit 312 of the user terminal 133 controls the communication unit 305 to transmit the content package creation request to the content server 132.

In step S371 (FIG. 20), when a content package creation request is transmitted, the content distribution unit 263 of the content server 132 controls the communication unit 255 and receives the content package creation request.

In step S372, the content distribution unit 263 controls the communication unit 255 to transmit a content material list including a list of reproduction conditions and content materials to the user terminal 133.

In step S352 (FIG. 19), the content editing management unit 312 controls the communication unit 305 to receive the content material list transmitted from the content server 132.

In step S353, the content editing management unit 312 controls the display or the like of the output unit 303 to display the content material list, and displays an image prompting setting of the reproduction condition of the content by editing the reproduction condition and the content on the basis of the displayed content material list to generate a content package.

In step S354, the content editing management unit 312 determines whether or not the reproduction condition and the editing of the content are completed on the basis of the operation input of the input unit 302, and in a case where it is not determined that the editing is completed, the processing returns to step S353. That is, the processing of steps S353 and S354 is repeated until the reproduction condition and the content editing are completed.

Then, in a case where it is determined in step S354 that the editing of the content is completed, the processing proceeds to step S355.

In step S355, the content editing management unit 312 controls the communication unit 305 to transmit the content package generated by completion of editing to the content server 132.

In step S373 (FIG. 20), the content distribution unit 263 of the content server 132 controls the communication unit 255 to determine whether or not the content package is transmitted from the user terminal 133, and repeats similar processing until the content package is transmitted.

Then, in a case where it is determined in step S373 that the content package has been transmitted, the processing proceeds to step S374.

In step S374, the content distribution unit 263 controls the communication unit 255 to receive the content package transmitted from the user terminal 133, store the content package as the reproduction condition and the content in the storage unit 254, and register the content package in the interaction information DB 272.

In step S375, the content distribution unit 263 controls the communication unit 255 to transmit the content package transmitted from the user terminal 133 to the vehicle 131, and sets reproduction of the content.

In step S391 (FIG. 21), the content reproduction management unit 164 of the vehicle 131 controls the communication unit 152 to receive the transmitted content package, stores the content package in the storage unit 158, and controls the content setting unit 221 to set the reproduction of the content on the basis of the acquired content package.

More specifically, the content setting unit 221 discriminates the attribute of the content for which reproduction is set, specifies the type of the device of the content output unit 165 to be output, and supplies information on the included reproduction condition to the reproduction condition determination unit 222.

In step S392, the reproduction condition determination unit 222 determines whether or not the supplied reproduction condition is satisfied, and repeats similar processing until it is determined that the reproduction condition is satisfied.

Then, in a case where it is determined in step S392 that the reproduction condition is satisfied, the processing proceeds to step S393.

In step S393, the content setting unit 221 reads the content stored in the storage unit 158, outputs the content to the corresponding device in the content output unit 165 according to the attribute of the content, and reproduces the content.

In step S394, the content reproduction management unit 164 controls the communication unit 152 to notify the content server 132 of the completion of the reproduction of the content, and ends the processing.

In step S376 (FIG. 20), the content distribution unit 263 of the content server 132 controls the communication unit 255 to determine whether or not a notification of the completion of the reproduction of the content is provided from the vehicle 131, and repeats the similar processing until a notification of the completion of the reproduction is provided.

In a case where it is determined in step S376 that a notification of the completion of the reproduction of the content is provided, the processing proceeds to step S377.

In step S377, the content distribution unit 263 erases the content stored in the storage unit 254, updates the interaction information DB 272, and deletes information of the erased content.

In step S378, the content distribution unit 263 controls the communication unit 255 to notify the user terminal 133 that the reproduction of the content is completed, and ends the processing.

In step S356 (FIG. 19), the content editing management unit 312 of the user terminal 133 controls the communication unit 305 to determine whether or not a notification of the completion of reproduction of the content is provided from the content server 132, and repeats similar processing until a notification of the completion of reproduction is provided.

Then, in a case where it is determined in step S356 that a notification of the completion of the reproduction of the content is provided, the processing proceeds to step S357.

In step S357, the content editing management unit 312 controls the display or the like of the output unit 303, presents information indicating that the reproduction of the content is completed, and ends the processing.

With the above processing, the user who operates the user terminal 133 can edit the content to be reproduced under a desired reproduction condition with respect to the vehicle 131 sharing the drive image, transmit the content package via the content server 132, set the reproduction, and reproduce the content generated by the user of the user terminal 133 when the reproduction condition is satisfied.

As a result, the content to be reproduced is transmitted together with the reproduction condition from the user of the user terminal 133 who is provided with the virtual drive environment by sharing the drive image to the passenger of the vehicle 131, and the reproduction of the content is set, so that the content can be reproduced when the reproduction condition is satisfied.

As a result, under the environment in which the virtual drive environment is provided, the user (virtual passenger) of the user terminal 133 can cause the passenger of the vehicle 131 to effectively reproduce the content at an appropriate timing according to the reproduction condition, which leads to sharing of the realistic feeling and improvement of the sense of unity under the virtual drive environment.

Furthermore, in the above description, for example, as described with reference to FIG. 2, it is conceivable that recognition of a signboard of a store recommended by the user of the user terminal 133 is set as the reproduction condition, and when this reproduction condition is satisfied, processing of outputting a voice indicating approach of the corresponding store is performed as the content. However, other reproduction conditions and content may be used.

For example, when the passenger gets off on the way at the destination where the passenger moves, purchases a local product, and causes the in-vehicle imaging device to recognize the local product at the time of re-boarding, content including an image and a sound produced by the projection of the AR image and a sound effect such as a fanfare may be reproduced.

Furthermore, in the above, the embodiment has been described assuming that, under the situation where the virtual drive environment is provided by the drive image sharing processing, the interaction processing is executed while the user operating the user terminal 133 views the drive image in real time, the content reproduced under the predetermined reproduction condition is provided to the passenger of the vehicle 131, the content is reproduced when the reproduction condition is satisfied, and the drive image in the state where the content is reproduced is also shared.

However, the interaction processing may be performed at a timing different from the timing at which the drive image sharing processing is performed.

That is, for example, the content may be generated together with the reproduction condition by the user terminal 133 before the travel of the vehicle 131 is started, temporarily stored by the content server 132, and when the upload of the drive image from the vehicle 131 is started, the content may be supplied from the content server 132 to the vehicle 131, and the reproduction may be set.

That is, in a case where the interaction processing is performed in real time under an environment where the drive image sharing processing is performed, there is a limit to the number and volume of content that can be generated in the user terminal 133, and thus, for example, there is a possibility that the content passes through a position satisfying the reproduction condition while the user is editing the content, and cannot be appropriately reproduced.

Therefore, before the traveling by the vehicle 131 is started, the content may be generated together with the reproduction condition by the user terminal 133 in advance and uploaded to the content server 132, and when the traveling by the vehicle 131 is started, the content may be provided from the content server 132 to the vehicle 131.

In this way, it is possible to generate a plurality of content packages in advance according to various reproduction conditions, and it is possible to realize provision of more satisfactory content.

Furthermore, for example, advertisement content whose reproduction condition is to image a signboard of a store of a predetermined chain store may be generated in advance and stored in the content server 132, and reproduction may be set by supplying a drive image to the vehicle 131 whose start of traveling is recognized.

In this way, since the reproduction condition is satisfied every time the signboard of the chain store is included in the image captured as the drive image while the vehicle 131 that has received the supply of the content during traveling, it is possible to reproduce the advertisement content every time the chain store approaches. As a result, it is possible to improve the advertising effect of the chain store on the store.

<<2. Example Executed by Software>>

Incidentally, the series of processing described above can be executed by hardware, but can also be executed by software. In a case where the series of processing is performed by software, a program constituting the software is installed from a recording medium into, for example, a computer built into dedicated hardware or a general-purpose computer that is capable of performing various functions by installing various programs, or the like.

Figure 22:
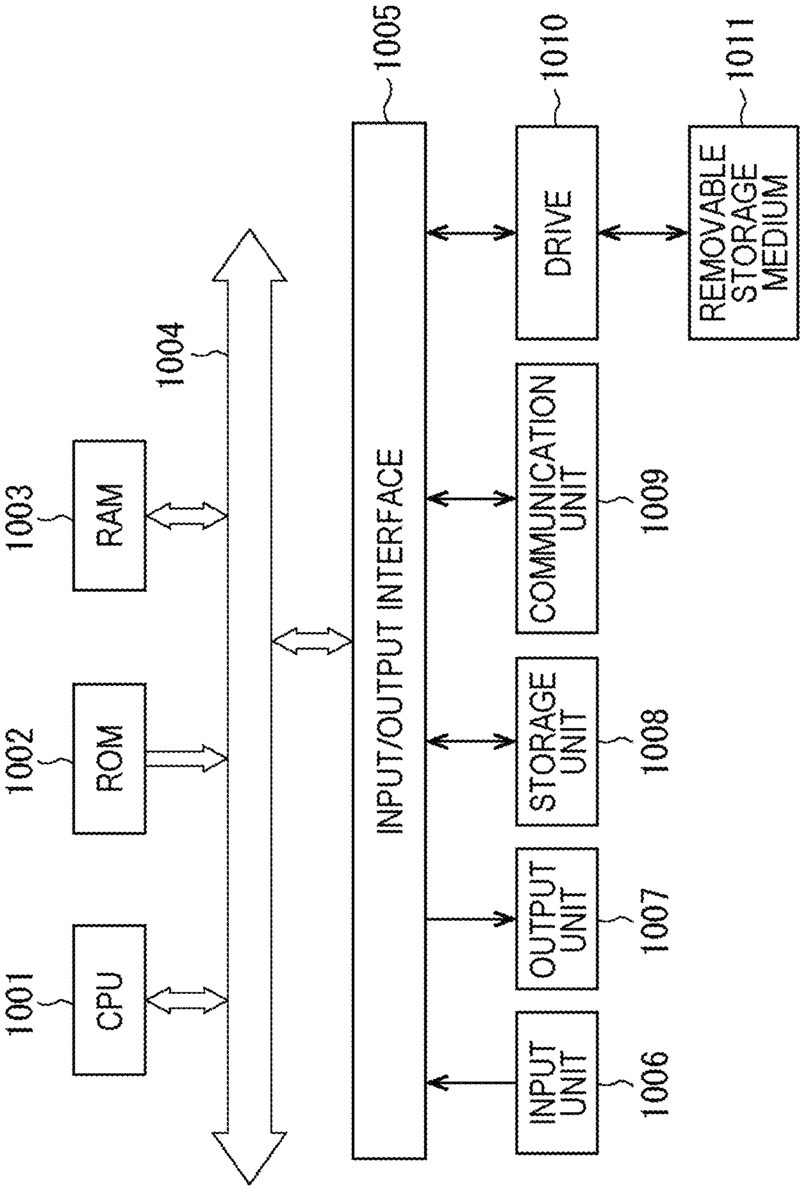
FIG. 22 illustrates a configuration example of a general-purpose computer.

FIG. 22 illustrates a configuration example of a general-purpose computer. This computer includes a built-in central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and performs communication processing via a network represented by the Internet are connected. Furthermore, a drive 1010 that reads and writes data from and to a removable storage medium 1011 such as a magnetic disk (including flexible disk), an optical disc (including compact disc-read only memory (CD-ROM) and digital versatile disc (DVD)), a magneto-optical disk (including mini disc (MD)), or a semiconductor memory is connected.

The CPU 1001 performs various processes in accordance with a program stored in the ROM 1002, or a program read from the removable storage medium 1011 such as a magnetic disk, an optical disc, a magneto-optical disk, or a semiconductor memory, installed in the storage unit 1008, and loaded from the storage unit 1008 into the RAM 1003. Furthermore, the RAM 1003 also appropriately stores data necessary for the CPU 1001 to perform various processes, and the like.

In the computer configured as described above, for example, the CPU 1001 loads the program stored in the storage unit 1008 into the RAM 1003 via the input/output interface 1005 and the bus 1004 and executes the program, to thereby perform the above-described series of processing.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage unit 1008 via the input/output interface 1005 by attaching the removable storage medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program that executes processing in time series in the order described in the present specification, or a program that executes processing in parallel or at a necessary timing such as when a call is made.

Note that the CPU 1001 in FIG. 22 implements the functions of the drive recorder control unit 163 and the content reproduction management unit 164 in FIG. 4, the control unit 251 in FIG. 6, and the control unit 301 in FIG. 9.

Furthermore, in the present specification, a system is intended to mean assembly of a plurality of components (devices, modules (parts), and the like) and it does not matter whether or not all the components are in the same housing. Therefore, a plurality of devices housed in separate housings and connected via a network and one device in which a plurality of modules is housed in one housing are both systems.

Note that the embodiment of the present disclosure is not limited to the above-described embodiment, and various modifications are possible without departing from the scope of the present disclosure.

For example, the present disclosure can adopt a configuration of cloud computing in which one function is shared by a plurality of devices via a network and processed in cooperation.

Furthermore, each step described in the above described flowcharts may be performed by one device or by a plurality of devices in a shared manner.

Furthermore, in a case where a plurality of processes is included in one step, the plurality of processes included in the one step can be executed by one device or can be shared and executed by a plurality of devices.

Note that the present disclosure may have the following configurations.

<1> A content distribution system including: a moving body; and a terminal device that operates by an operation input of a user who is not on the moving body, the moving body including:

an imaging unit that captures an image in front of the moving body in a moving direction;

a first communication unit that transmits the image to the terminal device; and a reproducing unit that reproduces a predetermined content when a predetermined reproduction condition is satisfied, the terminal device including:

a generation unit that edits a content to be reproduced in the moving body and a reproduction condition of the content to generate a content package;

a second communication unit that receives the image of the moving body and transmits the content package to the moving body; and an output unit that outputs the image of the moving body received by the second communication unit, in which the moving body receives the content package generated by the generation unit from the terminal device via the first communication unit, and reproduces the content in the reproduction unit on the basis of a reproduction condition included in the content package received.

<2> The content distribution system according to <1>, in which the reproduction condition is that a predetermined object is imaged by the imaging unit.

<3> The content distribution system according to <2>, in which the predetermined object is a predetermined person in front of the moving body, a predetermined sign in front of the moving body, a predetermined signboard in front of the moving body, or a vehicle of a predetermined vehicle type facing the moving body.

<4> The content distribution system according to <1>, in which the reproduction condition is that a capture operation by a passenger of the moving body is performed on the imaging unit.

<5> The content distribution system according to <1>, in which the moving body further includes an internal imaging unit that images an inside of the moving body, and the reproduction condition is that the internal imaging unit captures a predetermined motion of a passenger of the moving body or a predetermined article brought from outside the moving body.

<6> The content distribution system according to <1>, in which the moving body further includes a position information acquisition unit that acquires position information of the moving body, and the reproduction condition is that the position information of the moving body is at a predetermined position, within a predetermined distance from a predetermined position, or within a predetermined area.

<7> The content distribution system according to <1>, further including an audio acquisition unit that acquires audio, in which the reproduction condition is that a predetermined audio is acquired by the audio acquisition unit.

<8> The content distribution system according to <7>, in which the predetermined audio is a predetermined utterance by a passenger of the moving body.

<9> The content distribution system according to any one of <1> to <8>, in which the reproduction unit reproduces the content on a corresponding output device on the basis of an attribute of the content.

<10> The content distribution system according to <9>, in which the attributes include a sound effect, a moving image, a still image, a slide of a still image, an animation, a projection image, an augmented reality (AR) image, vibration, illumination, air blowing, and aroma generation, and a game.

<11> The content distribution system according to <9>, in which the output device includes a speaker, a display device, a lighting device, a vibration generation unit, a blower device, and an aroma generation device.

<12> The content distribution system according to <10>, in which the generation unit edits and generates a content to be reproduced by the moving body together with the reproduction condition on the basis of a content material list in which materials of the content are listed.

<13> An operation method of a content distribution system including: a moving body; and a terminal device that operates by an operation input of a user who is not on the moving body, an operation method of the moving body including the steps of:

capturing an image in front of the moving body in a moving direction;

transmitting the image to the terminal device; and reproducing a predetermined content when a predetermined reproduction condition is satisfied, an operation method of the terminal device including the steps of:

editing a content to be reproduced in the moving body and a reproduction condition of the content to generate a content package;

receiving the image of the moving body and transmitting the content package to the moving body together with the reproduction condition; and outputting the image received of the moving body, further including a step in which the moving body receives the content package generated by the terminal device and reproduces the content on the basis of a reproduction condition included in the content package received.

<14> A program for causing, among computers that control a content distribution system including: a moving body; and a terminal device that operates by an operation input of a user who is not on the moving body, a computer that controls the moving body to function as:

an imaging unit that captures an image in front of the moving body in a moving direction;

a first communication unit that transmits the image to the terminal device; and a reproducing unit that reproduces a predetermined content when a predetermined reproduction condition is satisfied, a computer that controls the terminal device to function as:

a generation unit that edits a content to be reproduced in the moving body and a reproduction condition of the content to generate a content package;

a second communication unit that receives the image of the moving body and transmits the content to the moving body together with the reproduction condition; and an output unit that outputs the image of the moving body received by the second communication unit, and further a computer that controls the moving body to function as:

the first communication unit that receives the content package generated by the generation unit; and a reproduction unit that reproduces the content on the basis of a reproduction condition included in the content package received.

<15> A moving body including:

an imaging unit that captures an image in front of a moving body in a moving direction;

a communication unit that transmits the image to a terminal device operated by an operation input of a user who is not on the moving body, and receives a content package generated by editing a content and a reproduction condition by the terminal device; and a reproduction unit that reproduces the content when the reproduction condition is satisfied.

<16> An operation method of a moving body, the operation method including the steps of:

capturing an image in front of a moving body in a moving direction;

transmitting the image to a terminal device operated by an operation input of a user who is not on the moving body, and receiving a content package generated by editing a content and a reproduction condition by the terminal device; and reproducing the content when the reproduction condition is satisfied.

<17> A program for causing a computer to function as:

an imaging unit that captures an image in front of a moving body in a moving direction;

a communication unit that transmits the image to a terminal device operated by an operation input of a user who is not on the moving body, and receives a content package generated by editing a content and a reproduction condition by the terminal device; and a reproduction unit that reproduces the content when the reproduction condition is satisfied.

<18> A terminal device including:

a generation unit that generates a content package by editing a content to be reproduced in a moving body on which a user of the moving body does not board and a reproduction condition of the content;

a communication unit that receives an image of the moving body and transmits the content package to the moving body; and an output unit that outputs the image of the moving body.

<19> An operation method of a terminal device, the operation method including the steps of:

generating a content package by editing a content to be reproduced in a moving body on which a user of the moving body does not board and a reproduction condition of the content;

receiving an image of the moving body and transmitting the content package to the moving body; and outputting the image of the moving body.

<20> A program for causing a computer to function as:

a generation unit that generates a content package by editing a content to be reproduced in a moving body on which a user of the moving body does not board and a reproduction condition of the content;

a communication unit that receives an image of the moving body and transmits the content package to the moving body; and an output unit that outputs the image of the moving body.

REFERENCE SIGNS LIST

11 Content distribution system
131, 131-1 to **131-*n*** Vehicle
132 Content server
133, 133-1 to **133-*m*** User terminal
134 Network
154 Position information acquisition unit
155 External recognition sensor
156 In-vehicle sensor
163 Drive recorder control unit
164 Content reproduction management unit
165 Content output unit
203 Recognition unit
221 Content setting unit
222 Reproduction condition determination unit
261 Information acquisition unit
262 Drive image distribution unit
263 Content distribution unit
273 Drive image
311 Vehicle connection processing unit
312 Content editing management unit

The invention claimed is:

1. A content distribution system comprising:

a moving body; and a terminal remote from the moving body that operates by an operation input of a user who is not on the moving body, wherein the moving body includes circuitry configured to:

capture an image in front of the moving body with the moving body moving in a moving direction;

transmit the image to the terminal; and reproduce a predetermined content under a condition where a predetermined reproduction condition is satisfied, wherein the terminal includes circuitry configured to:

edit each of a content to be reproduced as the predetermined content in the moving body and the predetermined reproduction condition to generate a content package;

receive the image from the moving body and transmit the content package to the moving body; and output the image received from the moving body, wherein the circuitry of the moving body receives the content package from the terminal via a wireless network, wherein the circuitry of the moving body reproduces the predetermined content based on the receipt of the image at the circuitry of the terminal and under the condition where the predetermined reproduction condition is satisfied, wherein the predetermined reproduction condition for the reproduction of the predetermined content is set by the terminal, and wherein the predetermined reproduction condition for the reproduction of the predetermined content and the predetermined content to be reproduced for the moving body are specific to the image from the moving body.

2. The content distribution system according to claim 1, wherein the reproduction condition is that a predetermined object is imaged by the circuitry of the moving body.

3. The content distribution system according to claim 2, wherein the predetermined object is a predetermined person in front of the moving body, a predetermined sign in front of the moving body, a predetermined signboard in front of the moving body, or a vehicle of a predetermined vehicle type facing the moving body.

4. The content distribution system according to claim 1, wherein the reproduction condition is that a capture operation of a passenger of the moving body is performed by the circuitry of the moving body.

5. The content distribution system according to claim 1, wherein the circuitry of the moving body is configured to image an inside of the moving body, and the reproduction condition is capture of a predetermined motion of a passenger of the moving body or a predetermined article brought from outside the moving body.

6. The content distribution system according to claim 1, wherein the circuitry of the moving body is configured to acquire position information of the moving body, and the reproduction condition is that the position information of the moving body is at a predetermined position, within a predetermined distance from the predetermined position, or within a predetermined area.

7. The content distribution system according to claim 1, further comprising:

audio acquisition circuitry configured to acquire audio, wherein the reproduction condition is that a predetermined audio is acquired by the audio acquisition circuitry.

8. The content distribution system according to claim 7, wherein the predetermined audio is a predetermined utterance by a passenger of the moving body.

9. The content distribution system according to claim 1, wherein the circuitry of the moving body reproduces the content on a corresponding output device on a basis of one or more attributes of the content.

10. The content distribution system according to claim 9, wherein the one or more attributes include a sound effect, a moving image, a still image, a slide of a still image, an animation, a projection image, an augmented reality (AR) image, vibration, illumination, air blowing, aroma generation, and/or a game.

11. The content distribution system according to claim 9, wherein the output device includes a speaker, a display, a light output source, a vibration generator, a blower, and/or an aroma generator.

12. The content distribution system according to claim 10, wherein the circuitry of the terminal device edits and generates the predetermined content to be reproduced by the circuitry of the moving body together with the predetermined reproduction condition on a basis of a content material list in which materials of the predetermined content are listed.

13. An operation method of a content distribution system comprising: a moving body; and a terminal remote from the moving body that operates by an operation input of a user who is not on the moving body, the operation method comprising:

an operation method of the moving body including:

capturing an image in front of the moving body with the moving body moving in a moving direction;

transmitting the image to the terminal; and reproducing a predetermined content under a condition where a predetermined reproduction condition is satisfied, and an operation method of the terminal including:

editing each of a content to be reproduced as the predetermined content in the moving body and the predetermined reproduction condition to generate a content package;

receiving the image from the moving body via a wireless network and transmitting to the moving body via the wireless network the content package and the predetermined reproduction condition; and outputting the image received from the moving body, wherein the operation method further comprises:

the moving body receiving the content package and reproducing the predetermined content based on the receipt of the image at the circuitry of the terminal and under the condition where the predetermined reproduction condition is satisfied, wherein the predetermined reproduction condition for the reproduction of the predetermined content is set by the terminal, and wherein the predetermined reproduction condition for the reproduction of the predetermined content and the predetermined content to be reproduced for the moving body are specific to the image received from the moving body.

14. A non-transitory computer-readable storage medium having stored thereon instructions that, when executed by one or more processors, causes the one or more processors to perform a method regarding a content distribution system comprising: a moving body; and a terminal remote from the moving body that operates by an operation input of a user who is not on the moving body, as the method comprising:

capturing an image in front of the moving body with the moving body moving in a moving direction;

transmitting the image to the terminal;

reproducing a predetermined content when under a condition where a predetermined reproduction condition is satisfied;

editing each of a content to be reproduced as the predetermined content in the moving body and the predetermined reproduction condition to generate a content package;

receiving the image from the moving body via a wireless network and transmitting to the moving body via the wireless network the content package and the predetermined reproduction condition; and outputting the image received from the moving body, wherein the method further comprises:

the moving body receiving the content package; and reproducing the predetermined content based on predetermined content and under the condition where the predetermined reproduction condition is satisfied, wherein the predetermined reproduction condition for the reproduction of the predetermined content is set by the terminal, and wherein the predetermined reproduction condition for the reproduction of the predetermined content and the predetermined content to be reproduced for the moving body are specific to the image received from the moving body.

15. A moving body comprising:

circuitry configured to capture an image external to the moving body with the moving body moving in a moving direction;

transmit via a wireless network the image to a terminal remote from the moving body that is operated by an operation input of a user who is not on the moving body;

receiving at the moving body a content package generated by editing a content and a predetermined reproduction condition at the terminal;

reproducing the content in the moving body under a condition where the predetermined reproduction condition is satisfied, wherein the predetermined reproduction condition for the reproduction of the content and the content to be reproduced in the moving body are specific to the image transmitted to the terminal.

16. An operation method of a moving body, the operation method comprising:

capturing an image external to the moving body with the moving body moving in a moving direction;

transmitting the image to a terminal remote from the moving body that is operated by an operation input of a user who is not on the moving body;

receiving a content package generated by editing a content and a predetermined reproduction condition at the terminal; and reproducing the content in the moving body under a condition where the predetermined reproduction condition is satisfied, wherein the predetermined reproduction condition for the reproduction of the content and the content to be reproduced in the moving body are specific to the image transmitted to the terminal.

17. A non-transitory computer-readable storage medium having stored thereon instructions that, when executed by one or more processors, causes the one or more processors to function as:

an imaging unit that captures an image external to a moving body with the moving body moving in a moving direction;

a communication unit that transmits the image to a terminal device remote from the moving body and operated by an operation input of a user who is not on the moving body, and that receives a content package generated by editing a content and a predetermined reproduction condition by the terminal device; and a reproduction unit that reproduces the content in the moving body under a condition where the predetermined reproduction condition being satisfied, wherein the predetermined reproduction condition for the reproduction of the content is set by the terminal device, and wherein the predetermined reproduction condition for the reproduction of the content and the predetermined content to be reproduced in the moving body are specific to the image transmitted to the terminal device.

18. A terminal device comprising:

circuitry configured to generate a content package by editing a content to be reproduced in a moving body that is remote from the terminal device and a reproduction condition for reproducing the content at the moving body;

receive an image associated with the moving body; and transmit the content package to the moving body to reproduce the content in the moving body under a condition where the reproduction condition is satisfied and responsive to the receipt of the image associated with the moving body; and output the image associated with the moving body at the terminal device, wherein the reproduction condition for the reproduction of the content and the content to be reproduced at the moving body are specific to the image received at the terminal device.

19. An operation method of a terminal device, the operation method comprising:

generating a content package by editing each of a content to be reproduced in a moving body remote from the terminal device and a reproduction condition to trigger reproducing the content in the moving body;

receiving an image from circuitry of the moving body;

transmitting the content package to the circuitry of the moving body to reproduce the content in the moving body under a condition where the reproduction condition is satisfied and responsive to the receipt of the image from the circuitry of the moving body; and outputting the image received from the circuitry of the moving body at the terminal device, wherein the reproduction condition for the reproduction of the content and the content to be reproduced in the moving body are specific to the image received from the circuitry of the moving body.

20. A non-transitory computer-readable storage medium having stored thereon instructions that, when executed by one or more processors, causes the one or more processors to perform a method regarding program for causing a computer to function as:

a generation unit that generates a content package by editing a content to be reproduced in a moving body and a reproduction condition to trigger reproducing the content in the moving body;

a communication unit that receives an image associated with the moving body and that transmits the content package to the moving body to reproduce the content in the moving body under a condition where the reproduction condition is satisfied and responsive to the receipt of the image associated with the moving body; and an output unit that outputs the image associated with the moving body at a terminal device remote from the moving body, wherein the reproduction condition for the reproduction of the content and the content to be reproduced in the moving body are specific to the received image.

* * * * *